United States Patent
Kuki et al.

(10) Patent No.: US 11,022,728 B2
(45) Date of Patent: Jun. 1, 2021

(54) DISPLAY DEVICE

(71) Applicant: SHARP KABUSHIKI KAISHA, Sakai (JP)

(72) Inventors: Hikaru Kuki, Sakai (JP); Ryoh Araki, Sakai (JP); Tsuyoshi Kawaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 110 days.

(21) Appl. No.: 16/499,240

(22) PCT Filed: Mar. 23, 2018

(86) PCT No.: PCT/JP2018/011802
§ 371 (c)(1),
(2) Date: Sep. 27, 2019

(87) PCT Pub. No.: WO2018/181029
PCT Pub. Date: Oct. 4, 2018

(65) Prior Publication Data
US 2021/0109259 A1    Apr. 15, 2021

(30) Foreign Application Priority Data

Mar. 30, 2017  (JP) .............................. JP2017-068359

(51) Int. Cl.
*G02F 1/1335*    (2006.01)
*G02B 5/00*      (2006.01)

(52) U.S. Cl.
CPC .................................. *G02B 5/003* (2013.01)

(58) Field of Classification Search
CPC ........ G02B 5/003; G02B 27/22; G02B 30/00; G02B 30/27; G02B 30/26; G09F 9/30; H04N 13/305; H04N 13/31; H04N 13/00; H04N 13/349; G02F 1/133512
See application file for complete search history.

(56) References Cited

U.S. PATENT DOCUMENTS

| | | | |
|---|---|---|---|
| 5,956,001 A * | 9/1999 | Sumida ................ | H04N 13/341 345/55 |
| 2008/0218369 A1* | 9/2008 | Krans ................. | H01L 51/0097 340/691.1 |
| 2012/0113100 A1* | 5/2012 | Niioka ................. | H04N 13/305 345/419 |
| 2012/0236402 A1* | 9/2012 | Ohyama ................ | H04N 13/31 359/462 |
| 2014/0368622 A1* | 12/2014 | Koito ................... | H04N 13/305 348/54 |
| 2016/0041385 A1* | 2/2016 | Gotoh .................... | G02B 30/24 349/33 |
| 2019/0181613 A1* | 6/2019 | Kurosaka ................ | H01S 5/183 |
| 2019/0206287 A1* | 7/2019 | Kobayashi .......... | H01L 27/3244 |

FOREIGN PATENT DOCUMENTS

JP    2010-113348 A    5/2010

* cited by examiner

*Primary Examiner* — Balram T Parbadia
(74) *Attorney, Agent, or Firm* — ScienBiziP, P.C.

(57) ABSTRACT

In a display device in which a light shielding member having an opening formed in an image display surface of a display is arranged, occurrence of moire is prevented. A width (W1Y) of a first opening (OP1) in a first light shielding member (13) of a display (10) and a width (W2Y) of a second opening (OP2) of a second light shielding member (20) on a surface of the display (10) are set so that (W1Y−W2Y)/2>ΔLY is established.

6 Claims, 15 Drawing Sheets

FIG. 6

| WIDTH OF SECOND OPENING (μm) | VISIBILITY OF SECOND OPENING |
|---|---|
| 10 | NOT VISIBLE |
| 20 | NOT VISIBLE |
| 30 | NOT VISIBLE |
| 50 | VISIBLE |
| 70 | VISIBLE |

DISPLAY DEVICE

TECHNICAL FIELD

The present invention relates to a display device in which a light shielding member having an opening formed in an image display surface of a display is arranged.

BACKGROUND ART

A display device that allows a display image of a display to appear to emerge by arranging a light shielding member 120, in which openings OP102 are formed in a matrix pattern, in an image display surface of a display 110 as in a display device 101 illustrated in FIG. 16 is developed.

According to PTL 1, when a pitch of through holes is one third or less of a pixel pitch regardless of a size of the through holes, moire does not occur.

CITATION LIST

Patent Literature

PTL 1: Japanese Unexamined Patent Application Publication No. 2010-113348

SUMMARY OF INVENTION

Technical Problem

FIG. 17 illustrates a plane that includes a sectional surface of the display device 101, which is taken perpendicularly to the image display surface. A light shielding member that has light shielding units surrounding light output regions of pixels in a lattice shape is generally arranged in the display 110.

Thus, it is assumed that a cycle (pitch) of light shielding units 119 of a light shielding member 113 in the display 110 and a cycle (pitch) of light shielding units 121 of a light shielding member 120 are the same and a width W101 of an opening of the light shielding member 113 and a width W102 of an opening of the light shielding member 120 are the same.

In this case, when the display device 101 is seen from an observation point 105 apart from a center of an image display region by a distance D100, a light shielding unit 121 and a light shielding unit 119 are overlapped in different degrees between a vicinity of the center of the image display region and a vicinity of an edge thereof, which appears to be moire for an observer.

The cycle of the light shielding units 121 is set as P102 as illustrated in FIG. 18(*a*) and the cycle of the light shielding units 119 is set as P101 as illustrated in FIG. 18(*b*). A spatial frequency f102 of the light shielding units 121 is able to be represented by f102=1/P102. On the other hand, a spatial frequency f101 of the light shielding units 119 is able to be represented by f101=1/P101+(shift due to a visual field). The shift due to the visual field changes depending on a distance dd100 (refer to FIG. 17) between the light shielding member 120 and the light shielding member 113.

In a case where the light shielding units 121 and the light shielding units 119 are overlapped as illustrated in FIG. 18(*c*), a difference between f102 and f101 is seen as waviness and moire becomes conspicuous.

In PTL 1, a relationship of a size between the through holes and openings of pixels, a distance between a stainless steel plate where the through holes are formed and the pixels, or the like is not considered, and moire is prevented insufficiently.

The invention is made in view of the aforementioned problems and an object thereof is to prevent occurrence of moire in a display device in which a light shielding member having an opening formed in an image display surface of a display is arranged.

Solution to Problem

In order to solve the aforementioned problems, a display device according to an aspect of the invention includes: a first light shielding member that has, in an image display region of a display, light output regions of pixels arranged side by side in an X-axis direction and a Y-axis direction which are orthogonal to each other, and first non-openings that surround the light output regions in a lattice shape; and a second light shielding member that has openings arranged so as to cover the image display region and formed side by side in the Y-axis direction, and second non-openings provided between the openings, in which when a point apart from a center of the image display region by a specific distance is an observation point, a width of each of the light output regions in the Y-axis direction is W1Y, a width of each of the openings in the Y-axis direction is W2Y, a plane including a surface of each of the first non-openings, which is farther from the observation point, is a first plane, and a plane including a surface of each of the second non-openings, which is farther from the observation point, is a second plane, in a sectional surface of the first light shielding member and the second light shielding member, which is taken along the Y-axis direction, the second non-opening covers a whole of a surface of the first non-opening, which is closer to the observation point, and when a point where a straight line that extends from the observation point to the first plane and the second plane passes through a point Y1 which is an intersection point of a side wall, which is farther from the center of the image display region among side walls that constitute a target opening to be focused on among the openings, and the second plane and crosses the first plane is a point Y2, a point where a perpendicular line that extends from the point Y1 perpendicularly to the first plane crosses the first plane is a point Y3, and a distance between the point Y1 and the point Y3 is ΔLY, (W1Y−W2Y)/2>ΔLY is established.

In order to solve the aforementioned problems, a display device according to an aspect of the invention includes: a first light shielding member that has, in an image display region of a display, light output regions of pixels arranged side by side in an X-axis direction and a Y-axis direction which are orthogonal to each other, and first non-openings that surround the light output regions in a lattice shape; and a second light shielding member that has openings arranged so as to cover the image display region and formed side by side in the Y-axis direction, and second non-openings provided between the openings, in which when a point apart from a center of the image display region by a specific distance is an observation point, a width of each of the first non-openings in the Y-axis direction is P1Y, a width of each of the second non-openings in the Y-axis direction is P2Y, a plane including a surface of the first non-opening, which is closer to the observation point, is a third plane, and a plane including a surface of the second non-opening, which is closer to the observation point, is a fourth plane, in a sectional surface of the first light shielding member and the second light shielding member, which is taken along the Y-axis direction, the second non-opening covers a part of the surface of the first non-opening, which is closer to the observation point, and when a point where a straight line that extends from the observation point to the third plane and the fourth plane passes through a point Y1 which is an intersection point of a side wall, which is farther from the center of the image display region among side walls that constitute a target first non-opening to be focused on among the first non-openings, and the third plane and crosses the fourth plane is a point Y2, a point where a perpendicular line that extends from the point Y2 perpendicularly to the third plane crosses the third plane is a point Y3, and a distance between the point Y1 and the point Y3 is ΔLBY, (P1Y-P2Y)/2 ΔLBY is established.

Advantageous Effects of Invention

According to an aspect of the invention, an effect capable of preventing occurrence of moire in a display device in which a light shielding member having an opening formed in an image display surface of a display is arranged is exerted.

BRIEF DESCRIPTION OF DRAWINGS

FIG. 6 illustrates a relationship between a width of a second opening and visibility of the second opening of the display device according to Embodiment 1 of the invention.

DESCRIPTION OF EMBODIMENTS

Embodiment 1

Embodiment 1 of the invention will be described.
(Schematic Configuration of Display Device 1)

Figure 1:
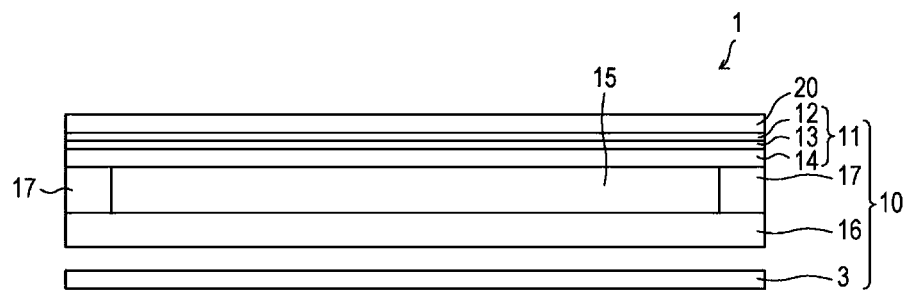
FIG. 1 is a sectional view illustrating a configuration of a display device according to Embodiment 1 of the invention.

FIG. 1 is a sectional view illustrating a configuration of a display device 1 according to Embodiment 1 of the invention.

The display device 1 includes a display 10 including a first light shielding member 13, and a second light shielding member 20 arranged in an image display surface of the display 10.

In the present embodiment, description will be given by assuming that the display 10 is an MEMS (Micro Electro Mechanical System) display. In the MEMS display, MEMS shutters are arranged in respective pixels. The MEMS display causes the MEMS shutters of the respective pixels to be opened or closed in accordance with an image to be displayed to thereby output light from the respective pixels or shield light. As a result, an image is displayed in an image display region of the MEMS display.

The display 10 includes an element substrate 11, silicone oil 15, a facing substrate 16, a sealing material 17, a backlight 3, and a controller (not illustrated).

The element substrate 11 and the facing substrate 16 are arranged to face each other via the silicone oil 15 and the sealing material 17. The element substrate 11, the silicone oil 15, the facing substrate 16, and the sealing material 17 constitute a display panel.

The backlight 3 is arranged on a back surface side (opposite to a side where the second light shielding member 20 is arranged) of the display panel. Thereby, in the present embodiment, light output from the backlight 3 is transmitted through the facing substrate 16, the silicone oil 15, the element substrate 11, and the second light shielding member 20 in this order. The not-illustrated controller controls driving of the display panel and the backlight 3.

Note that, at least one of a touch sensor and cover glass may be arranged on the second light shielding member 20 or below the second light shielding member 20 as needed.

The element substrate 11 includes a glass substrate 12, the first light shielding member 13 which is arranged on a rear surface side (side where the facing substrate 16 is arranged) of the glass substrate 12 and in which an opening is formed for each of pixels, a layered body 14 including various functional films, and not-illustrated MEMS shutters arranged in the pixels.

The first light shielding member 13 is able to be constituted by, for example, polyimide containing carbon black, or the like. A thickness of the first light shielding member 13 is, for example, about 0.5 μm.

The layered body 14 has, for example, a TFT element, various wires, an inorganic insulating film, an organic insulating film, and the like. Further, the MEMS shutters (not illustrated) are arranged on a surface of the layered body 14. After the element substrate 11 and the facing substrate 16 are arranged to face each other via the sealing material 17, the silicone oil 15 is injected to a space between the element substrate 11 and the facing substrate 16 through an injection port 53a provided in the sealing material 17 so that the silicon oil 15 is filled.

In addition, the display 10 may have a color filter included in the facing substrate 16 or the element substrate 11.

The second light shielding member 20 is able to be constituted by, for example, a resin film, a glass film, a metal film, or the like. A material of the resin film may be PET, PI, PEN, COP, COC, or the like. A material of the metal film may be aluminum, stainless steel, tin, or the like. The second light shielding member 20 is able to be formed by, for example, an evaporation method, an inkjet method, an offset method, a gravure printing method, or the like. When the second light shielding member 20 is constituted by the metal film, a method of forming a hole by etching, laser processing, or minute press may be used.

Ones in a variety of thicknesses are usable as the second light shielding member 20 in accordance with a model. For example, a thickness of the second light shielding member 20 is about 0.5 μm to 1000 μm.

Figure 2:
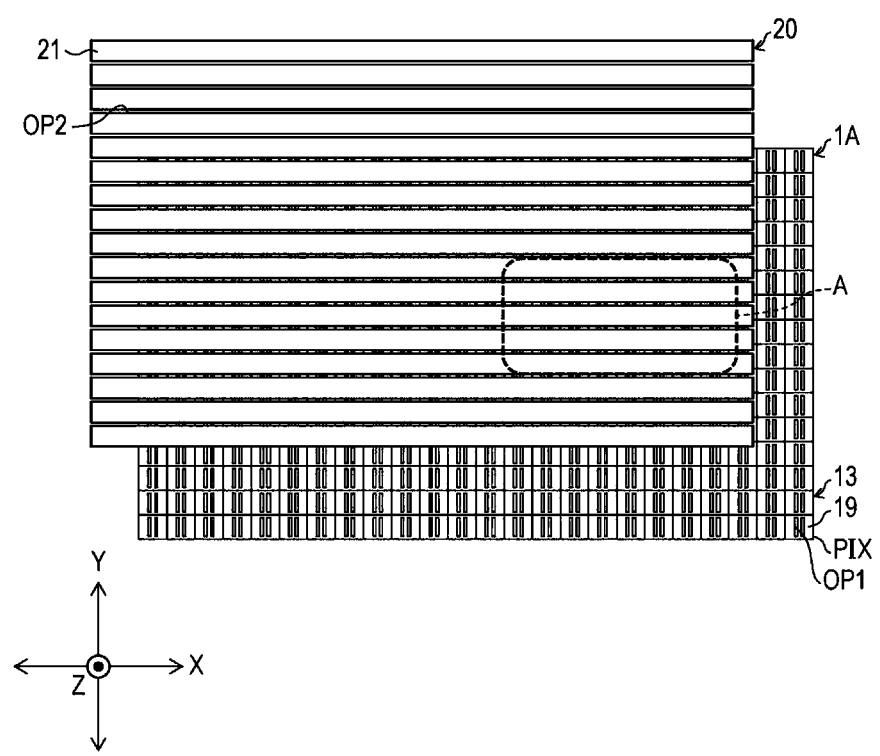
FIG. 2 illustrates a display and a second light shielding member of the display device according to Embodiment 1 of the invention.
Figure 3:
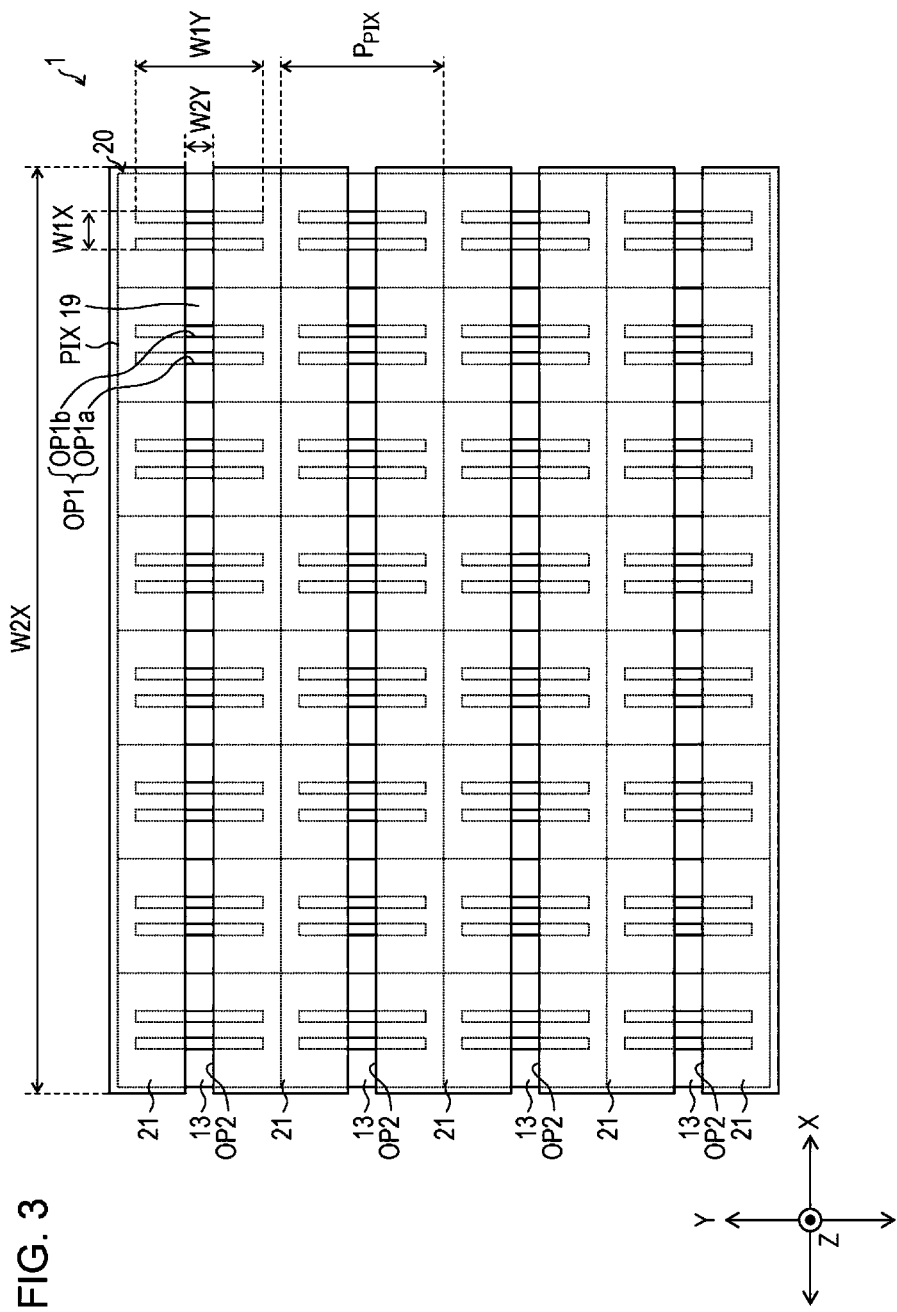
FIG. 3 is an enlarged view of a part of an image display region of the display device according to Embodiment 1 of the invention.

FIG. 2 illustrates the display 10 and the second light shielding member 20 of the display device 1 according to Embodiment 1 of the invention. FIG. 3 is an enlarged view of a part of an image display region of the display device 1 according to Embodiment 1 of the invention. Note that, in FIG. 2, the display 10 and the second light shielding member 20 are shifted for explanation in illustration.

In the image display region of the image display surface of the display device 1, pixels PIX are arranged in a matrix pattern.

In regions of the respective pixels PIX, first openings (light output regions) OP1 are provided. As described above, the first openings OP1 are formed in the first light shielding member 13 (refer to FIG. 1). The first openings OP1 are openings through which light from the backlight 3 (refer to FIG. 1) is transmitted. First non-openings 19 that are non-openings surrounding the first openings OP1 in a lattice shape are around the first openings OP. When the not-illustrated MEMS shutters are opened or closed, light transmitted through the first openings OP1 is shielded or not shielded. Thereby, the display device 1 displays an image in the image display region. In the present embodiment, each of the first openings OP1 has a rectangular shape.

In the second light shielding member 20, second openings (openings) OP2 are formed in a stripe pattern. A direction in which the second openings OP2 extend is referred to as an X-axis direction. The second openings OP2 extend across the respective pixels PIX in the X-axis direction. The second openings OP2 are arrayed in parallel in a Y-axis direction orthogonal to the X-axis direction. Second non-openings 21 that are non-openings are between the second openings OP2 in the second light shielding member 20. Note that, a direction orthogonal to an XY-axis plane is referred to as a Z-axis direction.

As illustrated in FIG. 3, the first openings OP1 of the respective pixels PIX and the second openings OP2 formed in the second light shielding member 20 cross. A longitudinal direction of each of the first openings OP1 is the Y-axis direction and a transverse direction orthogonal to the longitudinal direction is the X-axis direction.

A part of the first opening OP1 of each of the pixels PIX, which is covered by a second non-opening 21 of the second light shielding member 20, is shielded from light with the second non-opening 21. When light is output from a part where the first opening OP1 and a second opening OP2 cross, the display device 1 displays an image which appears to emerge.

The first opening OP1 has first sub-openings OP1a and OP1b that are two openings arranged side by side in the X-axis direction. In the present embodiment, the first sub-openings OP1a and OP1b are collectively referred to as the first opening OP1.

In a width of the first opening OP1, a width in the X-axis direction is set as W1X and a width in the Y-axis direction is set as W1Y. In a width of the second opening OP2, a width in the X-axis direction is set as W2X and a width in the Y-axis direction is set as W2Y. A cycle (pixel pitch) of the pixels PIX in the Y-axis direction is set as Pix.

In the present embodiment, W1Y>W2Y is provided in the Y-axis direction. Further, W1X<W2X is provided in the X-axis direction.

Since the second opening OP2 is successively open in the X-axis direction, moire having a cycle in the X-axis direction does not occur.

A position in the first opening OP1 to be overlapped with the second opening OP2 varies in the Y-axis direction between the pixels PIX depending on a viewing position of an observer.

For example, it is assumed that the observer views the image display region at a center position of the image display region of the display device 1 in the Y-axis direction. In this case, at a pixel PIX arranged in a center position among the pixels PIX arrayed in the Y-axis direction, the second opening OP2 appears to be overlapped at a vicinity of a center of the first opening OP1 for the observer. On the other hand, at a pixel PIX arranged at a position of an end among the pixels PIX arrayed in the Y-axis direction, the second opening OP2 appears to be overlapped at a vicinity of an end of the first opening OP1 for the observer.

Thus, there is a case where moire occurs depending on a relationship between the first opening OP1 and the second opening OP2.

In the present embodiment, as an example, W1Y:W1X is about 100:20. The first opening OP1 and the second opening OP2 cross orthogonally. For example, W2Y has a length about one fifth of W1Y. That is, W1Y:W2Y is about 100:20.

Thereby, a value of W1X is small in a region where the first opening OP1 and the second opening OP2 are overlapped, so that a ratio of occurrence of moire is able to be made smaller. Further, since a value of W2Y is small, a positional shift (shift of the spatial frequency) between the first opening OP1 and the second opening OP2, which appears in each of the pixels, in the Y-axis direction is hidden by a second non-opening 21, so that occurrence of moire is able to be suppressed.

Further, since a width of the second non-opening 21 (length of the second non-opening 21 in the Y-axis direction) is wide, it is also possible to suppress occurrence of moire due to an attachment shift between the display 10 and the second light shielding member 20.

In a case where the MEMS display is used as the display 10, however, a rectangular shape whose length in the Y-axis direction is longer than that in the X-axis direction is preferable to smoothly perform an open or close operation of the MEMS shutters.

Note that, the display 10 is not limited to the MEMS display, and various displays, for example, such as an LCD (liquid crystal display), a PDP (plasma display panel) display, an OLED (Organic light-emitting diode: organic EL) display, and an LED (Light Emitting Diode) display are usable. Also in a case where such an LCD, a PDP display, an OLED display, or an LED display is used, occurrence of moire is able to be suppressed when an aspect ratio of a light output region of each of the pixels is 100:20.

Moreover, the first opening OP1 may be a light output region from a pixel of the display. In a case of a display which does not include a backlight and in which a self-light emitting element is arranged in a pixel, the first opening OP may be a region where light is output from the pixel.

For example, in a case of the OLED display, the first opening OP1 is a region where an organic EL layer is arranged.

In a case of the LCD or the MEMS display, the facing substrate 16 is attached to the element substrate 11. Depending on use of the display 10, a glass substrate and cover glass that are used for a touch sensor are arranged on the element substrate 11. Further, respective layers are bonded with an OCA. Thus, a distance between the first light shielding member 13 and the second light shielding member 20 is relatively long. On the other hand, in the case of the OLED display, the distance between the first light shielding member 13 and the second light shielding member 20 is able to be relatively shortened.

Note that, in a case where the second openings OP2 extend across the plurality of first openings OP1 successively in the X-axis direction as in the present embodiment, occurrence of moire is able to be suppressed even in a case of W1Y:W1X=100:100.

Note that, though the first openings OP1 and the second openings OP2 have individual spatial frequency, they are arranged orthogonally, so that occurrence of moire is not found. A principle thereof will be described with reference to FIG. 10.

Figure 10:
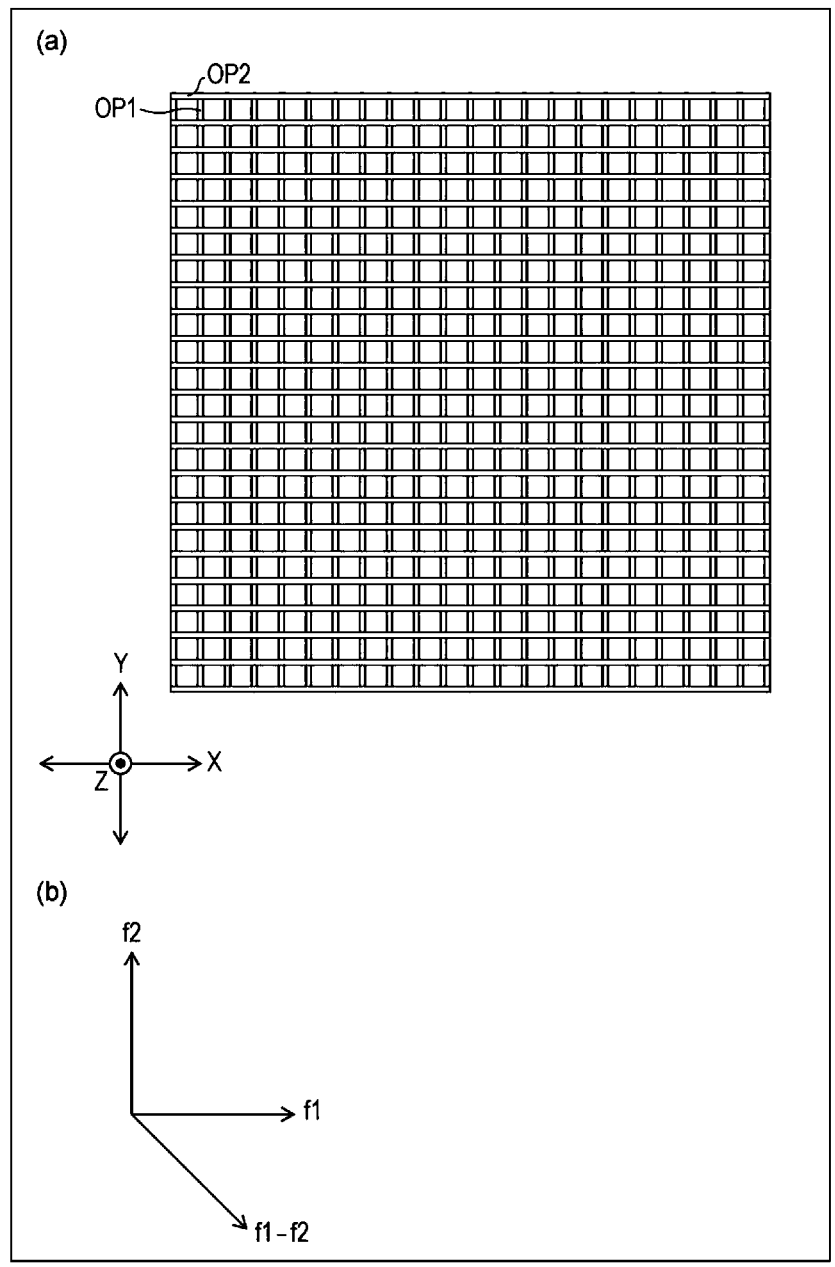
FIG. 10 conceptionally illustrates spatial frequencies of a first opening and a second opening of the display device according to Embodiment 3 of the invention.

FIG. 10 conceptually illustrates spatial frequencies of the first opening OP1 and the second opening OP2. FIG. 10(a) illustrates the first opening OP1 and the second opening OP2 that extend in the X-axis direction and the Y-axis direction and FIG. 10(b) illustrates the spatial frequencies of the first opening OP1 and the second opening OP2 by a vector.

As illustrated in FIGS. 10(a) and 10(b), even in a case where the spatial frequencies (cycles) of the first opening OP1 and the second opening OP2 are different, when longitudinal directions thereof are orthogonal, occurrence of moire is able to be suppressed.

In FIG. 10(b), f1 represents the spatial frequency of the first opening OP by the vector and f2 represents the spatial frequency of the second opening OP2 by the vector. Then, f1-f2 is able to be represented as illustrated in FIG. 10(b). When a difference between the vectors f2 and f1 is greater than f1, moire is not visible so that occurrence of moire is able to be suppressed. This is because f1 is so small that visual observation is not allowed.

Further, as to a size of the second opening OP2 illustrated in FIGS. 2 and 3, not only a condition under which moire does not occur but also a non-opening ratio by which a background part is not impaired while light is not lit needs to be considered. When the size itself of the second opening OP2 is too large, visual observation is allowed, so that the size is preferably reduced. The size of the second opening OP2 will be described later.

(Avoidance of Moire)

Figure 4:
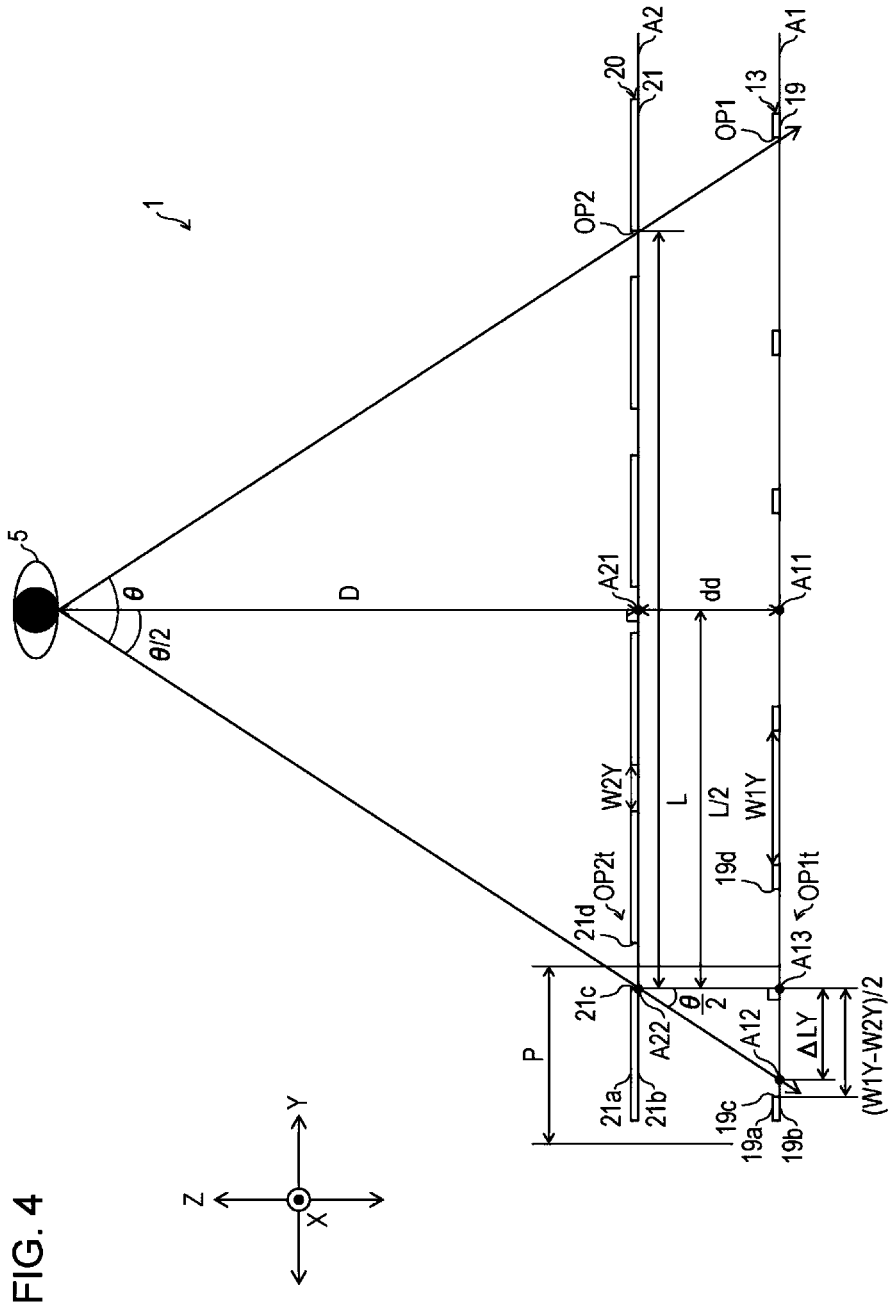
FIG. 4 illustrates a plane that includes a sectional surface of the display device according to Embodiment 1 of the invention, which is taken along the Y-axis direction perpendicularly to the image display surface.

FIG. 4 illustrates a plane that includes a sectional surface of the display device 1, which is taken along the Y-axis direction perpendicularly to the image display surface. With reference to FIG. 4, a positional relationship between the first light shielding member 13 and the second light shielding member 20 for avoidance of moire will be described.

The plane that includes the sectional surface of the display device 1, which is taken perpendicularly to the image display surface as illustrated in FIG. 4, is defined as follows.

A plane which includes, among a front surface (surface closer to the observer) 19a and a back surface (surface farther from the observer) 19b in a first non-opening 19 of the first light shielding member 13, the back surface 19b is set as a first plane A1.

A plane which includes, among a front surface (surface closer to the observer) 21a and a back surface (surface farther from the observer) 21b in a second non-opening 21 of the second light shielding member 20, the back surface 21b is set as a second plane A2.

A point which is in the center of the image display region in the display device 1 and apart from the second plane A2 by a distance D in the Z-axis direction is set as an observation point 5. The observation point 5 is at a position where a user appreciates an image displayed in the image display region of the display device 1. D is almost equal to a distance from eyes of the user to an image display screen of the display device 1. Note that, the center of the image display region is a point where diagonal lines cross in the image display region.

A point where a perpendicular line that extends from the observation point 5 so as to perpendicularly cross the first plane A1 and the second plane A2 crosses the second plane A2 is set as a point A21 and a point where the perpendicular line crosses the first plane A1 is set as a point A11.

Of side walls of a second non-opening 21 in the second light shielding member 20 that partitions a target second opening OP2t which is a certain second opening OP2 to be focused on among the second openings OP2, a side wall farther from the point A21 and a side wall closer thereto, which face each other, are respectively set as a side wall 21c and a side wall 21d.

Of side walls of a first non-opening 19 in the first light shielding member 13 that partitions a target first opening OP1t which is overlapped with the target second opening OP2t and is a first opening OP1 to be focused on among the first openings OP1, a side wall farther from the point A11 and a side wall closer thereto, which face each other, are respectively set as a side wall 19c and a side wall 19d.

A point where a straight line that extends from the observation point 5 in a direction of the first plane A1 and the second plane A2 crosses the side wall 21c and the second plane A2 is set as a point A22 and a point where the straight line crosses the first plane A1 is set as a point A12.

A point where a perpendicular line that extends from the point A22 so as to perpendicularly cross the first plane A1 crosses the first plane A1 is set as a point A13.

An angle formed by a straight line connecting the observation point 5 and the point A21 and a straight line connecting the observation point 5 and the point A22 is set as θ/2. An angle formed by a straight line, which is symmetrical to the straight line connecting the observation point 5 and the point A22 with regard to the straight line connecting the observation point 5 and the point A21, and the straight line connecting the observation point 5 and the point A22 is θ.

A distance from the second plane A2 to the first plane A1 is set as dd. Note that, dd is almost equal to the distance from the first light shielding member 13 to the second light shielding member 20.

A distance from the point A11 to the point A13 is set as L/2. A distance from a point symmetrical to the point A13 with regard to the point A11 to the point A13 is L.

A distance from the point A13 to the point A12 is set as ΔLY.

A distance from the point A13 to the side wall 19c on the first plane A1 is (W1Y−W2Y)/2. Note that, the distance from the point A13 to the side wall 19c on the first plane A1 is a distance from the side wall 21c to the side wall 19c in plan view of the display device 1 (when the display device 1 is seen as illustrated in FIG. 3). That is, (W1Y−W2Y)/2 is a shift amount between the side wall 21c and the side wall 13c (a shift amount of a positional shift between the first non-opening 19 and the second non-opening 21) in plan view of the display device 1.

A triangle constituted by the observation point 5, the point A21, and the point A22 and a triangle constituted by the point A22, the point A13, and the point A12 have similar shapes. That is, an angle formed by a straight line connecting the point A22 and the point A13 and a straight line connecting the point A22 and the point A12 is θ/2.

Thus, the following (formula 1) is established.

$$dd/\Delta LY = D/(L/2) \quad \text{(formula 1)}$$

Further, in the display device 1, (W1Y−W2Y)/2 and ΔLY satisfy the following (formula 2).

$$(W1Y-W2Y)/2 > \Delta LY \quad \text{(formula 2)}$$

Note that, an upper limit value of (W1Y−W2Y) depends on widths of the first opening OP1, the second opening OP2, the first non-opening 19, and the second non-opening 21, and other distances.

As a result, since the first non-opening 19 around the first opening OP1 is not seen from the observation point 5 through the second opening OP2, occurrence of moire is able to be prevented.

As an example, when D=50 cm, L=100 mm, and dd=0.4 mm, ΔL=0.04 mm is provided. Then, in a case of the pixel cycle (pixel pitch) $P_{PIX}$=0.120 mm and W1Y=0.1 mm, when W2Y<0.02 mm or less is provided by referring to the (formula 1) and (formula 2) described above, occurrence of moire is able to be prevented.

Note that, in a case where W1X>W2X is established in a sectional surface of the image display surface of the display device 1, which is taken along the X-axis direction, when a distance from the point A12 to the point A13 in the sectional surface of the display device 1 taken along the X-axis direction is ΔLX, by setting the first opening OP1 and the second opening OP2 in the sectional surface of the display device 1 taken along the X-axis direction so that the following (formula 3) is established, occurrence of moire having a cycle in the X-axis direction is able to be prevented.

$$(W1X-W2X)/2 > \Delta LX \quad \text{(formula 3)}$$

In FIG. 4, when the X-axis and the Y-axis are replaced to set W1Y as W1X and W2Y as W2X, the (formula 3) described above is able to be obtained similarly to the (formula 2) described above.

Figure 5:
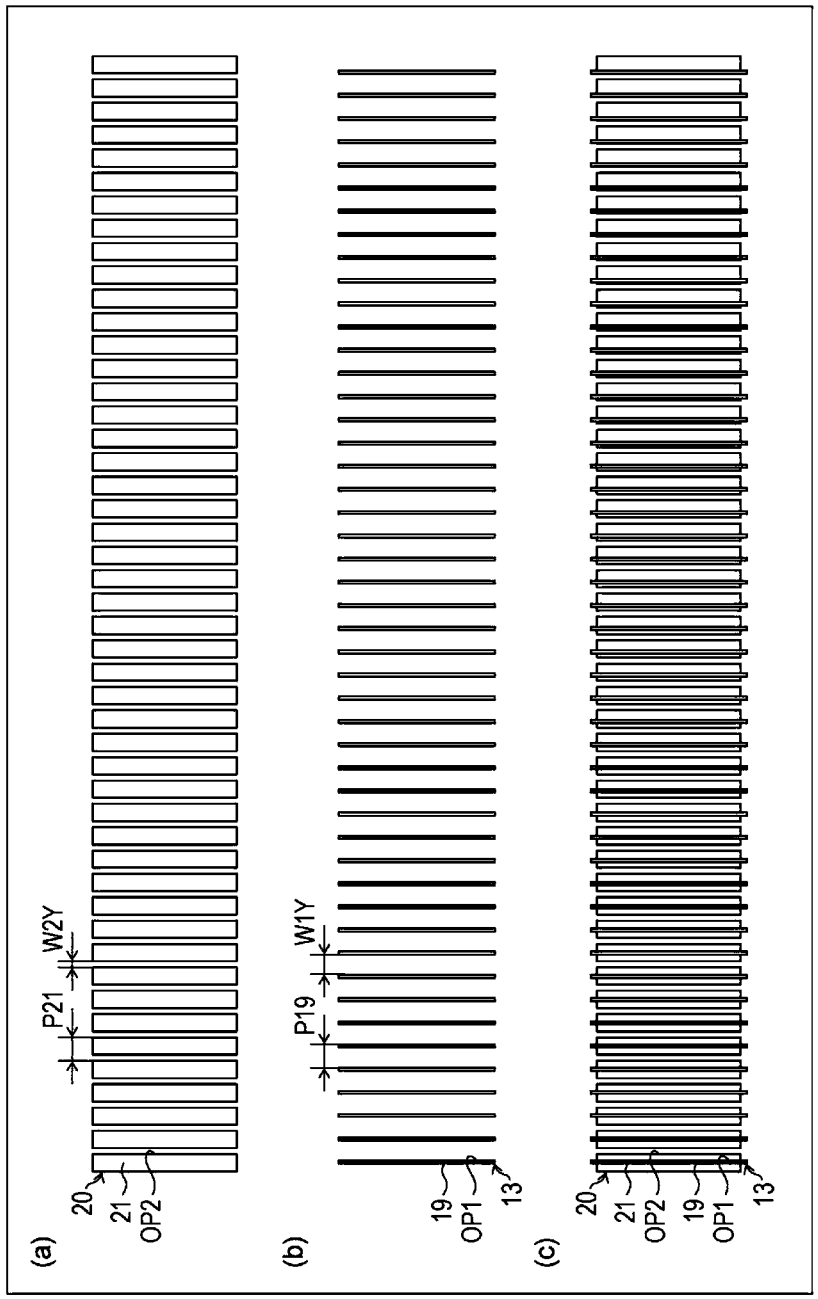
FIG. 5 illustrates a positional relationship between a first non-opening and a second non-opening of the display device according to Embodiment 1 of the invention.

FIG. 5 illustrates a positional relationship between the first non-opening and the second non-opening. FIG. 5(a) illustrates a state where the second non-openings 21 of the second light shielding member 20 are arrayed in the Y-axis direction, FIG. 5(b) illustrates a state where the first non-openings 19 of the first light shielding member 13 are arrayed in the Y-axis direction, and FIG. 5(c) illustrates a state where the second non-openings 21 of FIG. 5(a) and the first non-openings 19 of FIG. 5(b) are overlapped.

In FIG. 5(a), a cycle (pitch) P21 of the second non-openings 21 is set as 120 μm and the width W2Y of each of the second openings OP2 is set as 20 μm. In FIG. 5(b), a cycle (pitch) P19 of the first non-openings 19 is set as 120 μm and the width W1Y of each of the first openings OP1 is set as 90 μm. Note that, a shift due to a visual field (difference of visibility due to a distance from eyes) is also considered in FIG. 5(b).

As illustrated in FIG. 5(c), it is found that, even when the first non-openings 19 and the second non-openings 21 are overlapped and there is a certain degree of shift due to the visual field, the first non-opening 19 is not protruded from the second opening OP2 and moire is able to be prevented. Even when positions of the first non-opening 19 and the second non-opening 21 are shifted depending on a position, a positional shift between the first non-opening 19 and the second non-opening 21 is able to be allowed within a wide width of the second non-opening 21.

(Other indexes by which size of second opening OP2 is decided)

FIG. 6 illustrates a relationship between the width of the second opening OP2 and visibility of the second opening OP2. Other indexes by which the size of the second opening OP2 is decided will be described with reference to FIG. 6. The relationship between the first opening OP1 and the second opening OP2 to prevent occurrence of moire has been described above with reference to FIG. 5.

Not only prevention of occurrence of moire but also an opening ratio and visibility of the second opening OP2 need to be considered for the size of the second opening OP2.

When the width of the second opening OP2 is wide (that is, when the opening ratio of the second opening OP2 in a pixel PIX is large), a design expressed by the second opening OP2 allows transmission so that texture (closeness to real appearance) is not able to be expressed. On the other hand, as the width of the second opening OP2 is narrower, texture of an image from a background part (display 10) is able to be kept, but luminance in a display image of the display device 1 becomes dark accordingly.

Moreover, even in a case where the opening ratio of the second opening OP2 in the pixel PIX is small, when the width of the second opening OP2 is wide, the second opening OP2 is visible and it is difficult to achieve immersive texture of a material.

As illustrated in FIG. 6, when the width of the second opening OP2 is 10 μm, 20 μm, or 30 μm, the second opening OP2 is not visible. Thus, it is found that the width of the second opening OP2 being less than 30 μm is preferable because it is reliable that the second opening OP2 is not visible and the texture of the image displayed by the display 10 is able to be kept.

Further, when the width of the second opening OP2 is 50 μm or 70 μm, the second opening OP2 is visible. Thus, it is found that, when the width of the second opening OP2 is less than 50 μm, visual observation is difficult to be performed and the texture of the image is able to be kept.

(Effect)

As described above, the display device 1 has the first light shielding member 13 and the second light shielding member 20. The first light shielding member 13 has, in the image display region of the display 10, the first openings OP1 of the pixels PIX arranged side by side in the X-axis direction and the Y-axis direction that are orthogonal to each other, and the first non-openings 19 that surround the first openings OP1 in the lattice shape. The second light shielding member 20 has the second openings OP2 arranged so as to cover the image display region and formed side by side in the Y-axis direction, and the second non-openings 21 that are provided between the second openings OP2.

Then, in the sectional surface of the display device 1 taken along the Y-axis direction, the second non-opening 21 covers a whole of the front surface 19a of the first non-opening 19, which is a surface closer to the observation point 5. That is, W1Y>W2Y is provided.

Further, in the sectional surface of the display device 1 taken along the Y-axis direction, the straight line that extends from the observation point 5 to the first plane A1 and the second plane A2 passes through the point A22 which is an intersection point of the side wall 21c, which is farther from the point A21 among the side walls 21c and 21d that constitute the target second opening OP2t to be focused on among the second openings OP2, and the second plane A2.

Further, when a point where the straight line crosses the first plane A1 is set as the point A12, a point where the perpendicular line that extends from the point A22 perpendicularly to the first plane A1 crosses the first plane A1 is set as the point A13, and a distance between the point A22 and the point A13 is ΔLY, W1Y, W2Y, and ΔLY are set so that the (formula 2) is established.

(W1Y−W2Y)/2>ΔLY    (formula 2) described above

Thus, when the observer observes an image displayed in the image display region from the observation point 5, it is possible to prevent that the first non-opening 19 is seen through the second opening OP2. This makes it possible to prevent occurrence of moire in the image displayed in the image display region. In particular, occurrence of moire having a cycle in the Y-axis direction is able to be prevented.

Further, the second openings OP2 extend so as to cross the plurality of first openings OP1 in the X-axis direction. Thus, it is possible to prevent occurrence of moire having a cycle in the X-axis direction.

Alternatively, the second openings OP2 may be formed side by side in the X-axis direction without crossing the plurality of first openings OP1 in the X-axis direction.

In this case, a width of each of the first openings OP1 in the X-axis direction is set as W1X and a width of each of the second openings OP2 in the X-axis direction is set as W2X. Further, W1X>W2X is provided.

In addition, when, in the sectional surface of the display device 1 taken along the X-axis direction, a point where the straight line that extends from the observation point 5 to the first plane A1 and the second plane A2 passes through the point A22 which is an intersection point of the side wall, which is farther from the A21 among the side walls that constitute the target second opening OP2t, and the second plane A2 and crosses the first plane A1 is the point A12, a point where the perpendicular line that extends from the point A22 to the first plane A1 crosses the first plane is the point A13, and a distance between the point A12 and the point A13 is ΔLX, the (formula 3) may be established.

(W1X−W2X)/2>ΔLX    (formula 3) described above

Thereby, when the observer observes an image displayed in the image display region from the observation point 5, it is possible to prevent that the first non-opening 19 is seen through the second opening OP2. This makes it possible to prevent occurrence of moire having a cycle in the X-axis direction in the image displayed in the image display region.

Further, when the first opening OP1 satisfies W1Y:W1X=100:20, intensity of moire that occurs is able to be set as Y-axis direction:X-axis direction=100:20 compared to a case of W1Y:W1X=100:100.

In a case where moire in the Y-axis direction (100) is able to be suppressed, even when all the remaining moire in the X-axis direction (20) is not able to be suppressed, the moire is able to be suppressed to an inconspicuous level.

Examples thereof include a case where trade-off between luminance and a non-opening ratio requires making respective design parameters close to limit values, and a case where it is necessary to allow that moire having a cycle in the X-axis direction is not able to be sufficiently eliminated due to an error at a time of attachment of the display 10 and the second light shielding member 20, a change of a distance of a viewpoint, or a change of a viewing angle.

Even in such a case, by setting W1Y:W1X=100:20, occurrence of moire is able to be suppressed compared to the case of W1Y:W1X=100:100.

Here, in the case of W1Y:W1X=100:20, an area of an opening part is reduced compared to the case of W1Y:W1X=100:100, so that it is concerned that luminance is lowered. However, it is possible to achieve improvement, for example, by making a contrivance not to lower the luminance by introducing a method of utilizing recycled light of a backlight used in the case of the MEMS display.

Embodiment 2

Another embodiment of the invention will be described as follows with reference to FIGS. 7 and 8. Note that, for convenience of description, a member having the same function as that of the member described in Embodiment 1 will be given the same reference sign and description thereof will be omitted.

Figure 7:
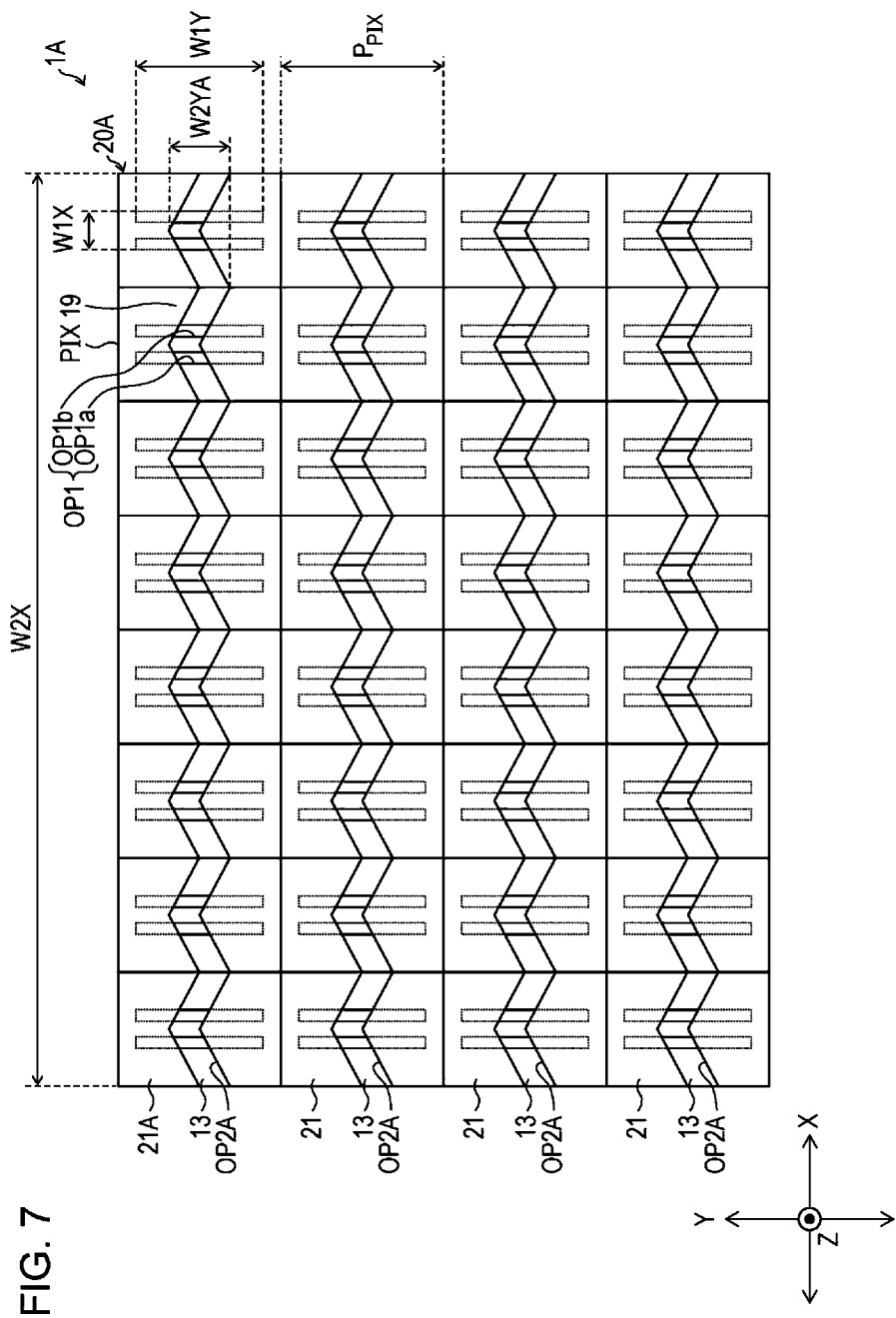
FIG. 7 is an enlarged view of a part of an image display region of a display device according to Embodiment 2 of the invention.

FIG. 7 is an enlarged view of a part of an image display region of a display device 1A according to Embodiment 2 of the invention.

The display device 1A includes a second light shielding member 20A instead of the second light shielding member 20 included in the display device 1 (refer to FIG. 3). The second light shielding member 20A has second non-openings 21A and second openings OP2A. Each of the second openings OP2A extends in the X-axis direction not linearly but so as to be repeatedly bent in a mountain shape in plan view. Thereby, the second openings OP2A are not orthogonal with but cross the first openings OP1 at an angle other than 90°.

Accordingly, compared to a case where the second openings OP2A and the first openings OP1 cross orthogonally, an area where the second openings OP2A are overlapped with the first openings OP1 is able to be increased without significantly reducing an area of the second non-openings 21 of the second light shielding member 20A. As a result, the display device 1A is able to increase luminance of a display image. Other configurations of the display device 1A are similar to those of the display device 1.

Even when a width of a second opening OP2A is wide, by shortening a distance between the display 10 and the second light shielding member 20A, a shift of the spatial frequency between the first opening OP1 and the second opening OP2A is suppressed, thus making it possible to prevent occurrence of moire.

Since the second opening OP2A is successively open in the X-axis direction, moire does not occur in the X-axis direction.

A width of the second opening OP2A in the Y-axis direction, which is bent in the mountain shape, is set as W2YA.

Figure 8:
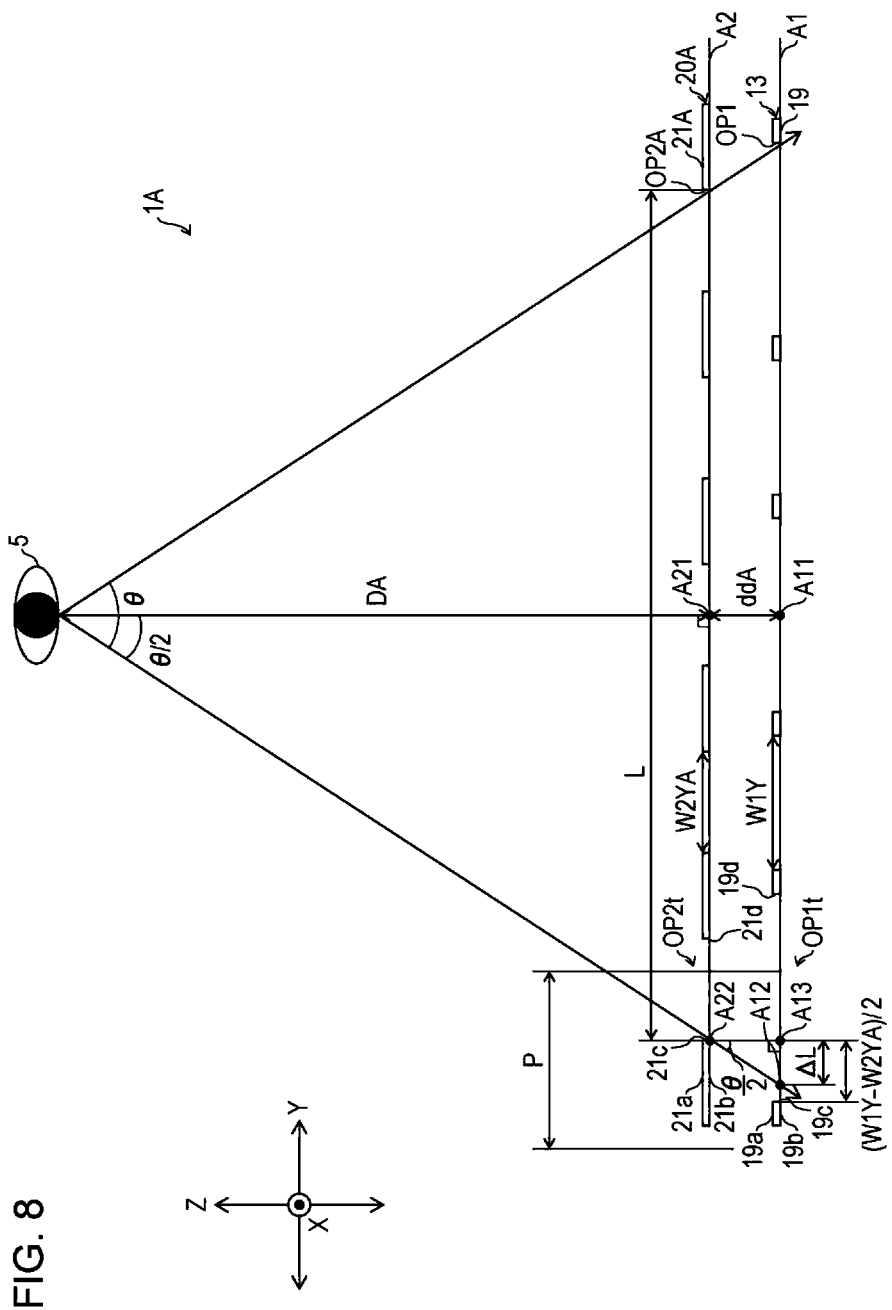
FIG. 8 illustrates a plane that includes a sectional surface of the display device according to Embodiment 2 of the invention, which is taken along the Y-axis direction perpendicularly to an image display surface.

FIG. 8 illustrates a plane that includes a sectional surface of the display device 1A, which is taken along the Y-axis direction perpendicularly to the image display surface.

In the present embodiment, W2YA>W2Y is provided.

When a distance from the observation point 5 to the second plane A2 is DA and a distance from the second plane A2 to the first plane A1 is ddA, DA>D and ddA<dd are provided.

Also in the display device 1A, by setting W1Y, W2YA, and ΔL so that the following (formula 4) is established similarly to the display device 1, occurrence of moire is able to be prevented.

$$(W1Y\text{-}W2YA)/2 > \Delta L \qquad \text{(formula4)}$$

Note that, an upper limit value of (W1Y-W2YA) depends on widths of the first opening OP1, the second opening oP2A, the first non-opening 19, and the second non-opening 21A, and other distances.

Here, W1Y>W2YA is provided.

Further, in a case where a width of the second opening OP2A in the X-axis direction is W2X and W1X>W2X is established in the X-axis direction, when the (formula 3) described above is established, similarly to the display device 1, occurrence of moire is able to be prevented.

Embodiment 3

Another embodiment of the invention will be described as follows with reference to FIGS. 9 and 11. Note that, for convenience of description, a member having the same function as that of the member described in Embodiments 1 and 2 will be given the same reference sign and description thereof will be omitted.

Figure 9:
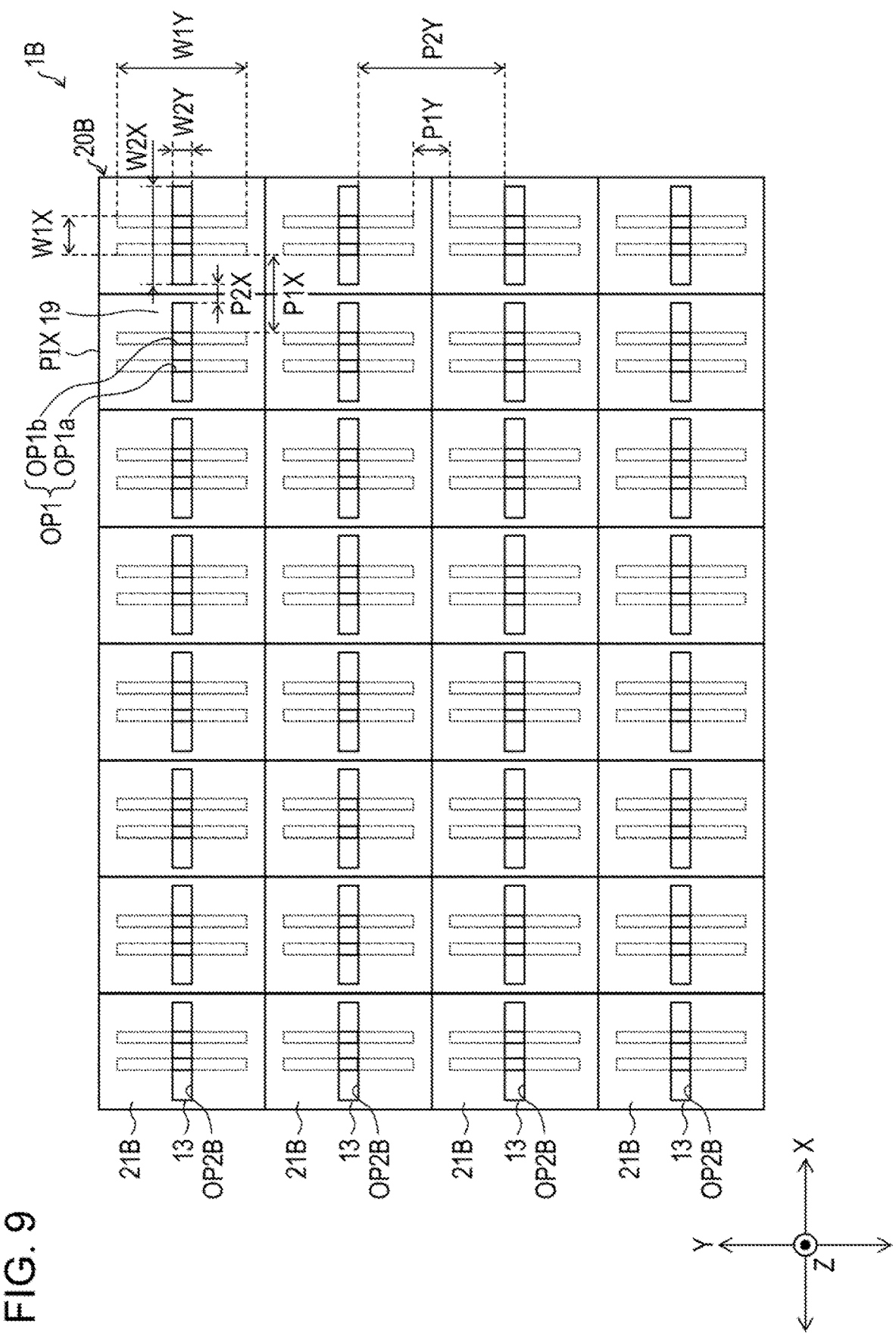
FIG. 9 is an enlarged view of a part of an image display region of a display device according to Embodiment 3 of the invention.

FIG. 9 is an enlarged view of a part of an image display region of a display device 1B according to Embodiment 3 of the invention.

The display device 1B includes a second light shielding member 20B instead of the second light shielding member 20 included in the display device 1 (refer to FIG. 3). Not the second opening OP2 but a second opening OP2B is formed in the second light shielding member 20B. The second opening OP2B extends in the X-axis direction, but is not provided across pixels PIX and is disconnected between adjacent pixels PIX. That is, the second light shielding member 20B is arranged in each pixel PIX so as to cross the first opening OP1.

A second non-opening 21B is around the second opening OP2B in the second light shielding member 20B.

A width of the second opening OP2B in the X-axis direction (longitudinal direction) is set as W2X. A width between second openings OP2B adjacent in the X-axis direction is set as P2X. A width between second openings OP2B adjacent in the Y-axis direction is set as P2Y.

A width between first openings OP1 adjacent in the X-axis direction is set as P1X. A width between first openings OP1 adjacent in the Y-axis direction is set as P1Y.

Figure 11:
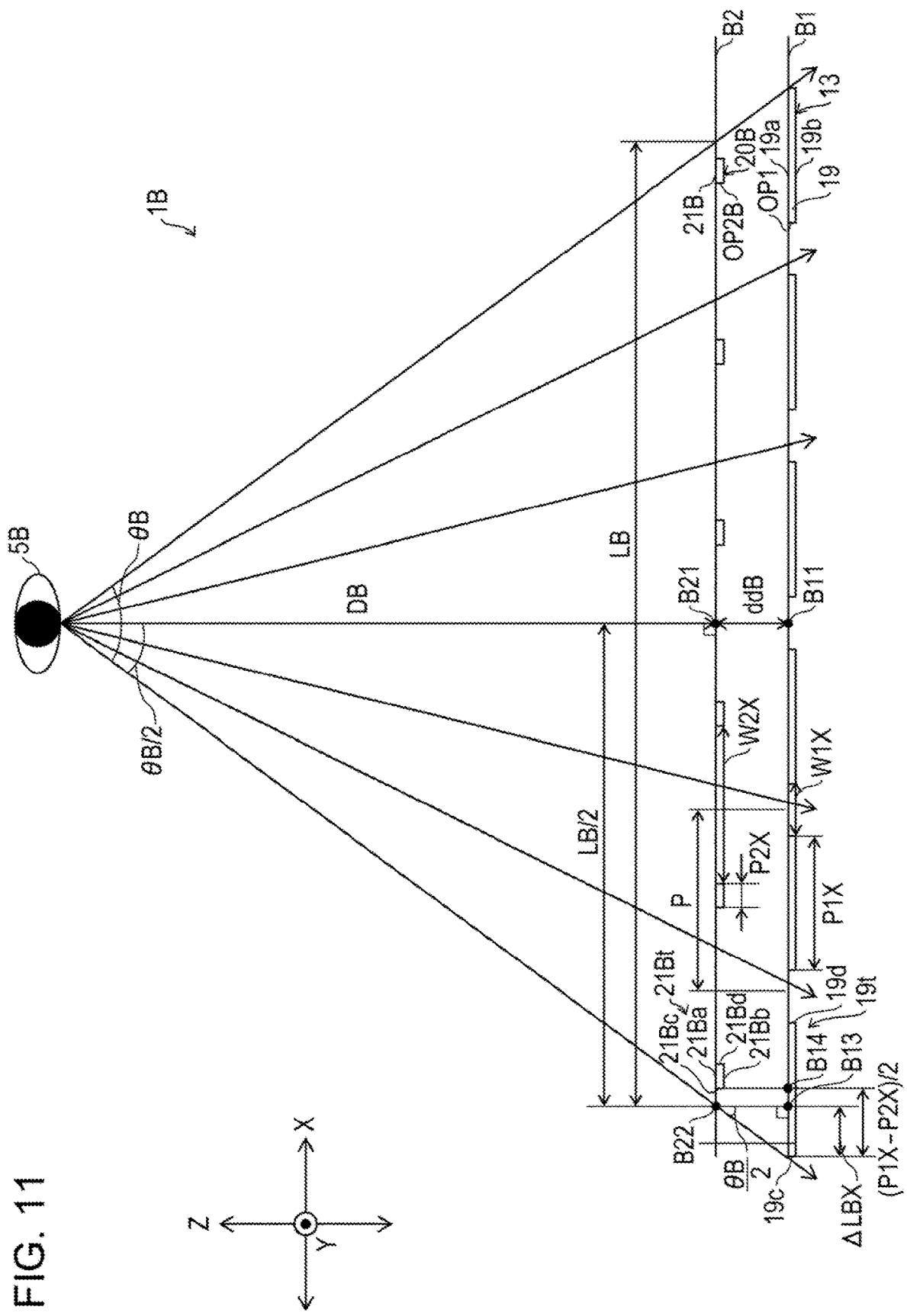
FIG. 11 illustrates a plane that includes a sectional surface of the display device according to Embodiment 3 of the invention, which is taken along the X-axis direction perpendicularly to the image display surface.

FIG. 11 illustrates a plane that includes a sectional surface of the display device 1B, which is taken along the X-axis direction perpendicularly to the image display surface.

In the sectional surface of the display device 1B, which is taken along the X-axis direction perpendicularly to the image display surface, P1X>P2X is provided. In other words, W1X<W2X is provided.

A plane which includes, among the front surface (surface closer to the observer) 19a and the back surface (surface farther from the observer) 19b in the first non-opening 19 of the first light shielding member 13, the front surface 19a is set as a third plane B1.

A plane which includes, among a front surface (surface closer to the observer) 21Ba and a back surface (surface farther from the observer) 21Bb in the second non-opening 21B of the second light shielding member 20B, the front surface 21Ba is set as a fourth plane B2.

The second non-opening 21B covers not a whole but a part of the front surface 19a of the first non-opening 19.

A point which is in a center of the image display region in the display device 1B and apart from the fourth plane B2 by a distance DB in the Z-axis direction is set as an observation point 5B. The observation point 5B is at a position where the user appreciates an image displayed in the image display region of the display device 1B. DB is almost equal to a distance from eyes of the user to an image display screen of the display device 1B.

A point where a perpendicular line that extends from the observation point 5B so as to perpendicularly cross the third plane B1 and the fourth plane B2 crosses the fourth plane B2 is set as a point B21 and a point where the perpendicular line crosses the third plane B1 is set as a point B11.

Of side walls of a target second non-opening 21Bt which is a certain second non-opening 21B to be focused on among second non-openings 21B, a side wall farther from the point B21 and a side wall closer thereto, which face each other, are respectively set as a side wall 21Bc and a side wall 21Bd.

Of side walls constituting a target first non-opening 19t which is overlapped with the target second non-opening 21Bt and is a first non-opening 19 to be focused on among the first non-openings 19, a side wall farther from the point B11 and a side wall closer thereto, which face each other, are respectively set as the side wall 19c and the side wall 19d.

A point where a straight line that extends from the observation point 5B in a direction of the third plane B1 and the fourth plane B2 crosses the side wall 19c and the third plane B1 is set as a point B12 and a point where the straight line crosses the fourth plane B2 is set as a point B22.

A point where a perpendicular line that extends from the point B22 so as to perpendicularly cross the third plane B1 crosses the third plane B1 is set as a point B13.

An angle formed by a straight line connecting the observation point 5B and the point B21 and a straight line connecting the observation point 5B and the point B12 is set as θB/2. An angle formed by a straight line, which is symmetrical to the straight line connecting the observation point 5B and the point B12 with regard to the straight line connecting the observation point 5B and the point B21 and the straight line connecting the observation point 5B and the point B12 is θB.

A distance from the fourth plane B2 to the third plane B1 is set as ddB. Note that, ddB is almost equal to a distance from the first light shielding member 13 to the second light shielding member 20B.

A distance from the point B11 to the point B13 is set as LB/2. A distance from a point symmetrical to the point B13 with regard to the point B11 to the point B13 is LB.

A distance from the point B13 to the point B12 is set as ΔLBX.

A point where a perpendicular line that extends from the side wall 21BC in the target second non-opening 21Bt so as to perpendicularly cross the third plane B1 crosses the third plane B1 is set as a point B14.

A distance from the point B14 to the side wall 19c on the third plane B1 is (P1X−P2X)/2. Note that, the distance from the point B14 to the side wall 19c on the third plane B1 is a distance from the side wall 19c to the side wall 21Bc in plan view of the display device 1B (when the display device 1B is seen as illustrated in FIG. 9). That is, (P1X−P2X)/2 is a shift amount between the side wall 19c and the side wall 21Bc (a shift amount of a positional shift between the first non-opening 19 and the second non-opening 21B) in plan view of the display device 1B.

A triangle constituted by the observation point 5B, the point B21, and the point B22 and a triangle constituted by the point B22, the point B13, and the point B12 have similar shapes. That is, an angle formed by a straight line connecting the point B22 and the point B13 and a straight line connecting the point B22 and the point B12 is θB/2.

Thus, the following (formula 5) is established.

$$ddB/\Delta LBX = DB/(LB/2) \quad \text{(formula 5)}$$

Further, in the display device 1B, (P1X−P2X)/2 and ΔLBX satisfy the following (formula 6).

$$(P1X-P2X)/2 > \Delta LBX \quad \text{(formula 6)}$$

Note that, an upper limit value of (P1X−P2X)/2 depends on widths of the first opening OP1, the second opening OP2B, the first non-opening 19, and the second non-opening 21B, and other distances.

Accordingly, the second non-opening 21B is not protruded from the first non-opening 19 and the second non-opening 21B is not seen from the observation point 5B, thus making it possible to prevent occurrence of moire.

For example, when DB=50 cm, LB=100 mm, P1X=0.08 mm, and ddB=0.3 mm, ΔLBX=0.03 mm is provided by the (formula 5).

When P2X is less than 0.02 mm in accordance with the (formula 6), occurrence of moire is able to be prevented.

According to the display device 1B, when the observer observes an image displayed in the image display region from the observation point 5B, it is possible to prevent that the second non-opening 21 is seen as being protruded from the first non-opening 19. This makes it possible to prevent occurrence of moire having a cycle in the X-axis direction in the image displayed in the image display region.

Further, since the non-opening ratio of the second light shielding member 20B in the X-axis direction is able to be increased, texture (closeness to real appearance) is able to be improved.

When not W2Y<W1Y but W2Y>W1Y (that is, P1Y>P2Y) is provided in the plane that includes the sectional surface of the display device 1B taken along the Y-axis direction, by setting (P1Y−P2Y) and ΔLBY similarly so that the following (formula 7) is established, occurrence of moire is able to be prevented. ΔLBY is a distance from the point B12 to the point B13 in the sectional surface of the display device 1B taken along the Y-axis direction.

$$(P1Y-P2Y)/2 > \Delta LBY \quad \text{(formula 7)}$$

In FIG. 11, when the X-axis and the Y-axis are replaced to set P1X as P1Y and P2X as P2Y, the (formula 7) described above is able to be obtained similarly to the (formula 6) described above.

As a result, occurrence of moire having a cycle in the Y-axis direction is able to be prevented. Additionally, since the non-opening ratio of the second light shielding member 20B in the Y-axis direction is able to be increased, texture (closeness to real appearance) is able to be improved.

Embodiment 4

Another embodiment of the invention will be described as follows with reference to FIGS. 12 to 15. Note that, for convenience of description, a member having the same function as that of the member described in Embodiments 1 to 3 will be given the same reference sign and description thereof will be omitted.

A case where the following patterns are combined with regard to the X-axis direction and the Y-axis direction of the first opening OP1 and the second opening OP2 will be described.

(1) First Pattern

W1Y>W2Y is provided and the (formula 2) is established.

$$(W1Y-W2Y)/2 > \Delta LY \quad \text{(formula 2)}$$

(2) Second Pattern

W1X>W2X is provided and the (formula 3) is established.

$$(W1X-W2X)/2 > \Delta LX \quad \text{(formula 3)}$$

(3) Third Pattern

W1X<W2X, that is, P1X>P2X is provided and the (formula 6) is established.

$$(P1X-P2X)/2 > \Delta LBX \quad \text{(formula 6)}$$

(4) Fourth Pattern

W1Y<W2Y, that is, P1Y>P2Y is provided and the (formula 7) is established.

$$(P1Y-P2Y)/2 > \Delta LBY \quad \text{(formula 7)}$$

Figure 12:
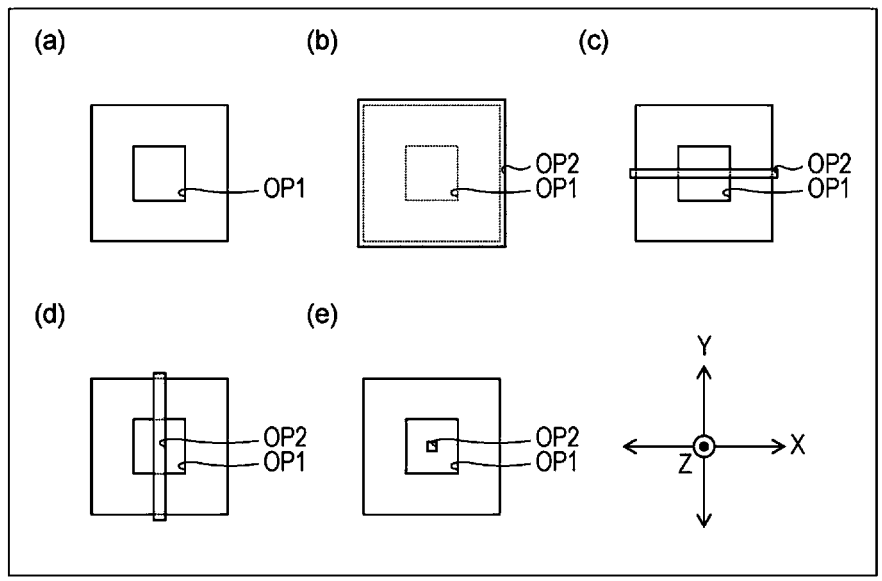
FIG. 12 illustrates a first opening and a second opening of a display device according to Embodiment 4 of the invention.
Figure 13:
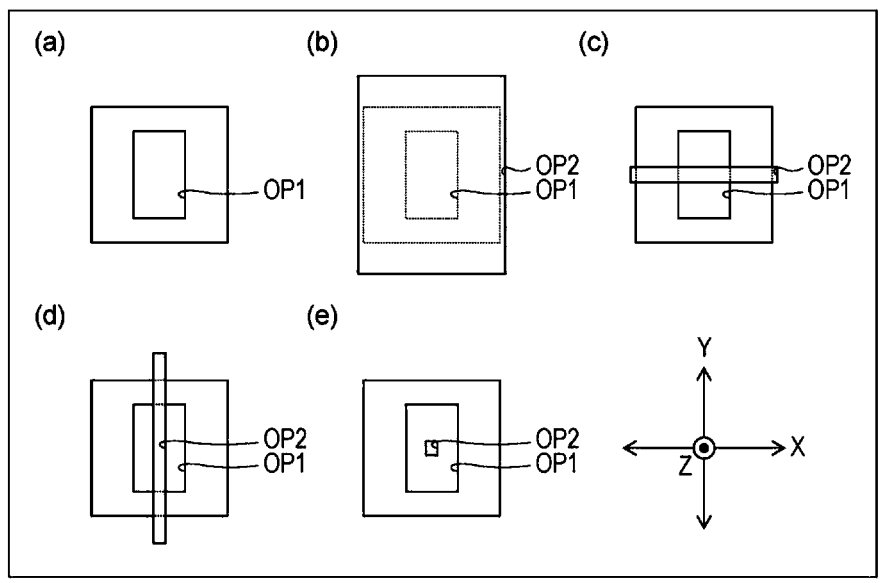
FIG. 13 illustrates a first opening and a second opening of a modified example 1 of the display device according to Embodiment 4 of the invention.
Figure 14:
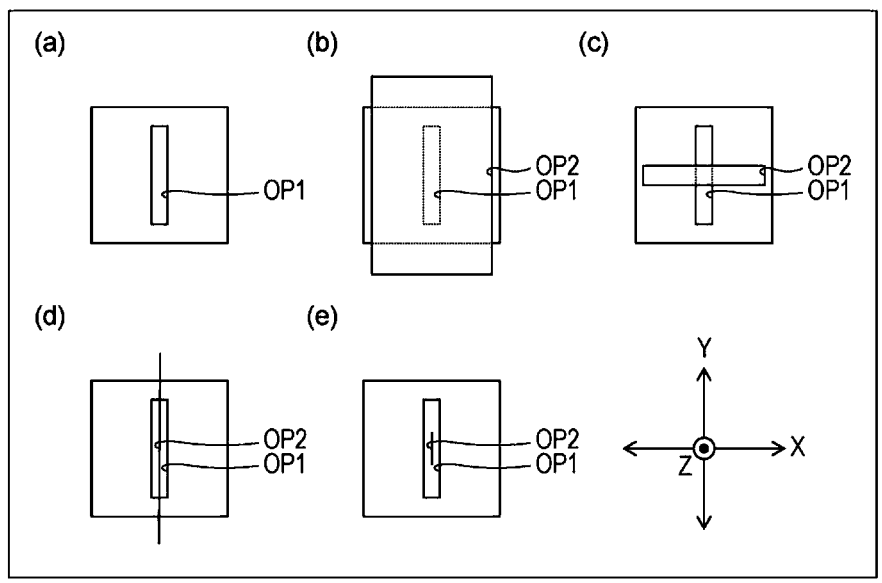
FIG. 14 illustrates a first opening and a second opening of a modified example 2 of the display device according to Embodiment 4 of the invention.
Figure 15:
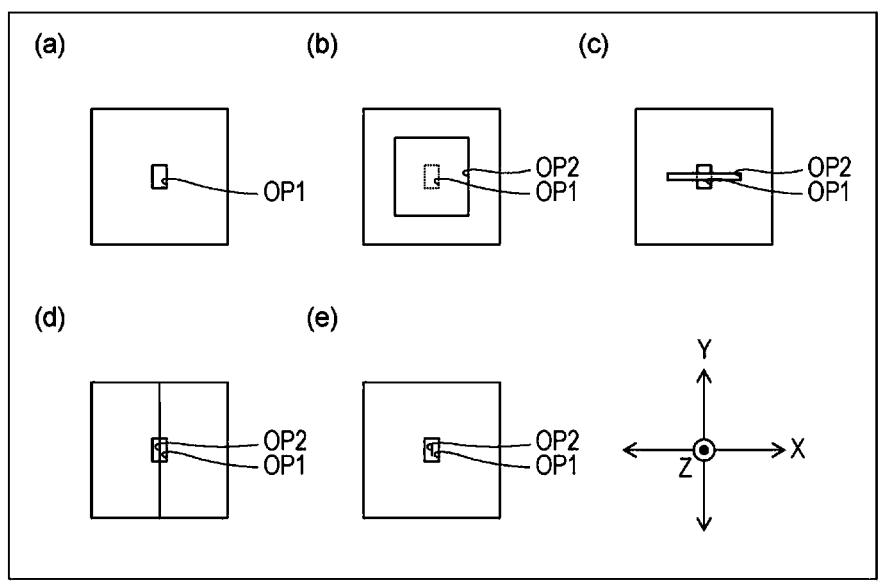
FIG. 15 illustrates a first opening and a second opening of a modified example 3 of the display device according to Embodiment 4 of the invention.
Figure 16:
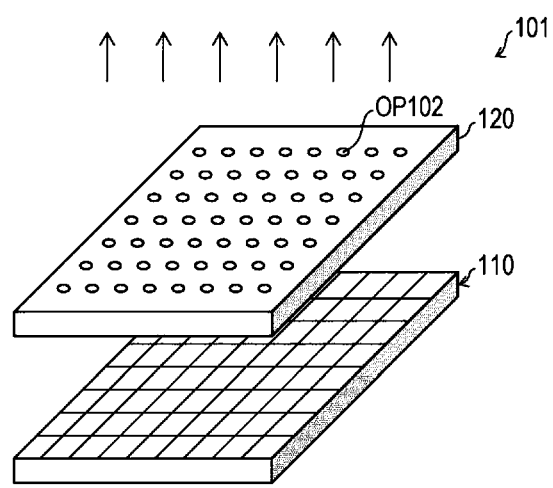
FIG. 16 is a perspective view illustrating a schematic configuration of a conventional display device.
Figure 17:
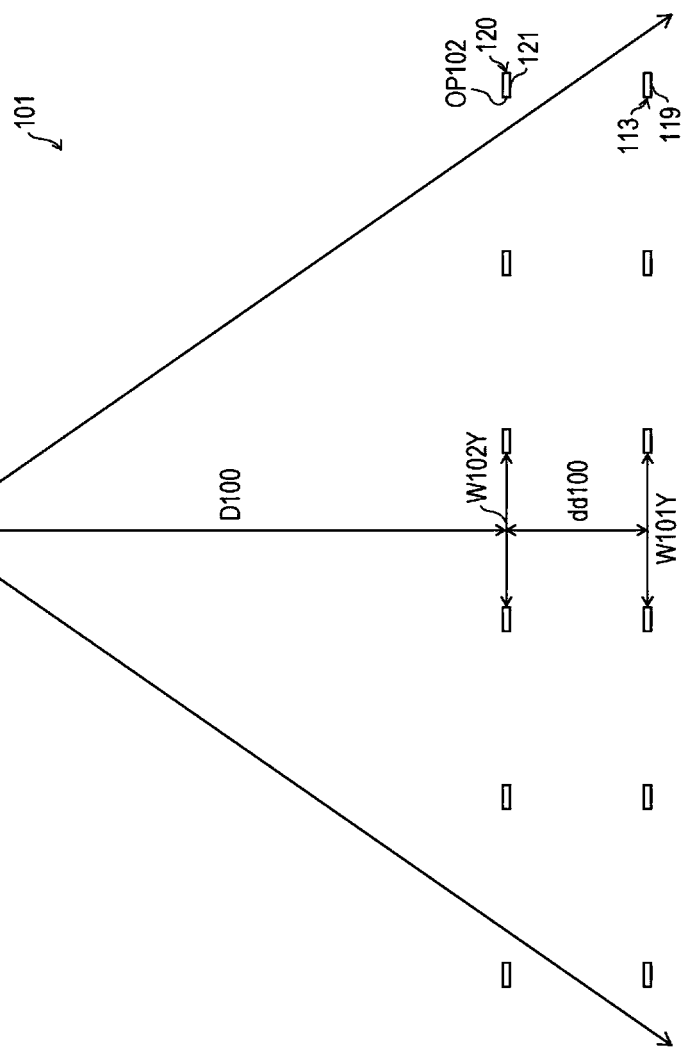
FIG. 17 illustrates a plane that includes a sectional surface of the conventional display device, which is taken along an image display surface.
Figure 18:
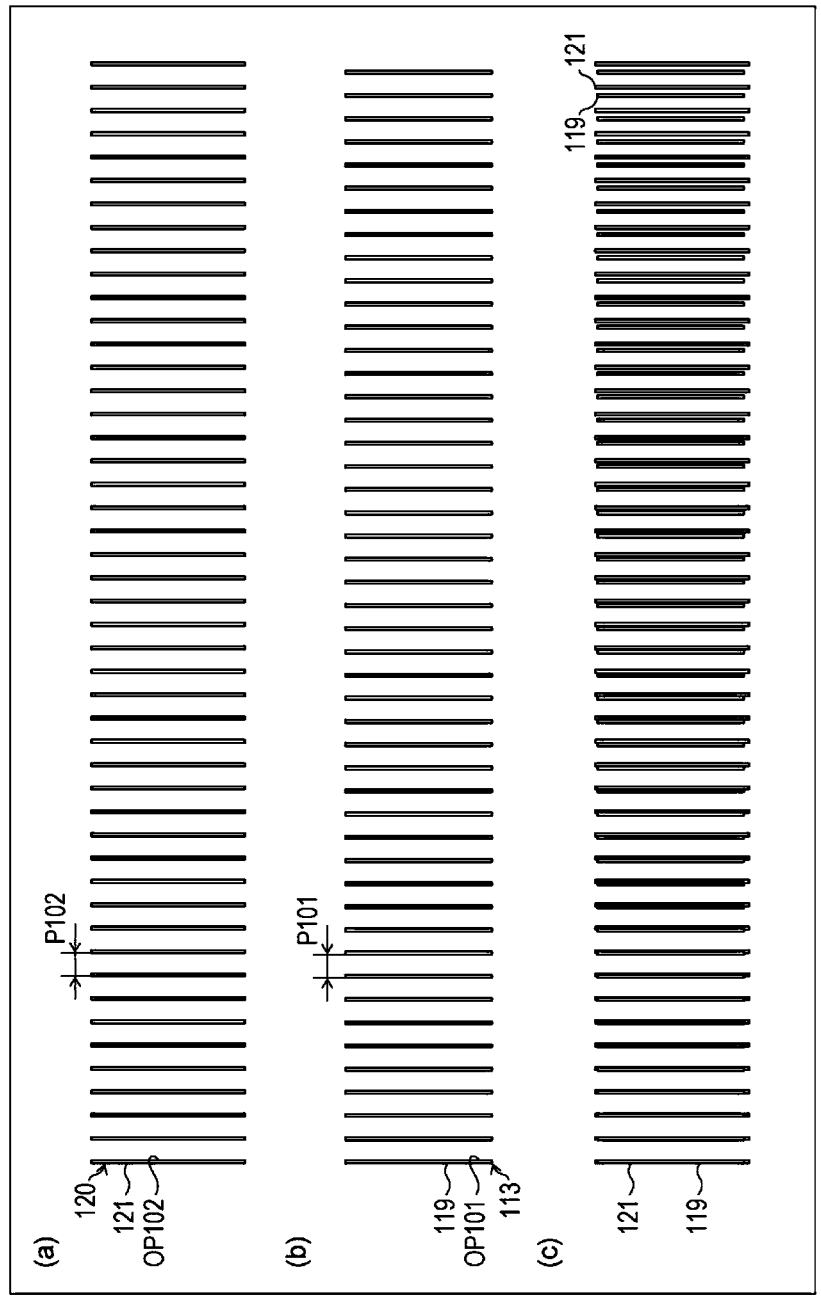
FIG. 18 illustrates a positional relationship between a first non-opening and a second non-opening of the conventional display device.

FIG. 12 illustrates a first opening and a second opening of a display device according to Embodiment 4 of the invention. FIG. 13 illustrates a first opening and a second opening of a modified example 1 of the display device according to Embodiment 4 of the invention. FIG. 14 illustrates a first opening and a second opening of a modified example 2 of the display device according to Embodiment 4 of the invention. FIG. 15 illustrates a first opening and a second opening of a modified example 3 of the display device according to Embodiment 4 of the invention.

FIG. 12(a) illustrates the first opening OP1 in a square shape. FIG. 13(a) illustrates the first opening OP1 in a rectangular shape. FIG. 14(a) illustrates the first opening OP1 in a rectangular shape whose width in the X-axis direction is narrower than that of FIG. 13(a). FIG. 15(a) illustrates the first opening OP1 in a rectangular shape whose width in the Y-axis direction is narrower than that of FIG. 14(a).

FIGS. 12(b), 13(b), 14(b), and 15(b) each illustrate the first opening OP1 and the second opening OP2 that satisfy the third pattern and the fourth pattern.

FIGS. 12(c), 13(c), 14(c), and 15(c) each illustrate the first opening OP1 and the second opening OP2 that satisfy the first pattern and the third pattern.

FIGS. 12(d), 13(d), 14(d), and 15(d) each illustrate the first opening OP1 and the second opening OP2 that satisfy the second pattern and the fourth pattern.

FIGS. 12(e), 13(e), 14(e), and 15(e) each illustrate the first opening OP1 and the second opening OP2 that satisfy the first pattern and the second pattern.

CONCLUSION

A display device 1 according to an aspect 1 of the invention includes: a first light shielding member 13 that has, in an image display region of a display 10, light output regions (first openings OP1) of pixels PIX arranged side by side in an X-axis direction and a Y-axis direction which are orthogonal to each other, and first non-openings 19 that surround the light output regions (first openings OP1) in a lattice shape; and a second light shielding member 20 that has openings (second openings OP2) arranged so as to cover the image display region and formed side by side in the Y-axis direction, and second non-openings 21 provided between the openings (second openings OP2), in which when a point apart from a center of the image display region by a specific distance is an observation point 5, a width of each of the light output regions in the Y-axis direction is W1Y, a width of each of the openings in the Y-axis direction is W2Y, a plane including a surface (back surface 19b) of each of the first non-openings 19, which is farther from the observation point 5, is a first plane A1, and a plane including a surface (back surface 21b) of each of the second non-openings 21, which is farther from the observation point 5, is a second plane A2, in a sectional surface of the first light shielding member and the second light shielding member, which is taken along the Y-axis direction, the second non-opening 21 covers a whole of a surface (front surface 19a) of the first non-opening 19, which is closer to the observation point 5, and when a point where a straight line that extends from the observation point 5 to the first plane A1 and the second plane A2 passes through a point Y1 (point A22) which is an intersection point of a side wall 21c, which is farther from the center of the image display region among side walls 21c and 21d that constitute a target opening (target second opening OP2t) among the openings (second openings OP2), and the second plane A2 and crosses the first plane A1 is a point Y2 (point A12), a point where a perpendicular line that extends from the point Y1 (point A22) perpendicularly to the first plane A1 and crosses the first plane A1 is a point Y3 (point A13), and a distance between the point Y1 (point A22) and the point Y3 (point A13) is $\Delta LY$, $(W1Y-W2Y)/2 > \Delta LY$ is established.

According to the aforementioned configuration, when an observer observes an image displayed in the image display region from the observation point, it is possible to prevent that the first non-opening is seen through the opening. This makes it possible to prevent occurrence of moire in the image displayed in the image display region.

In the display device 1 according to an aspect 2 of the invention, it is preferable that the openings (second openings OP2) extend so as to cross the plurality of light output regions (first openings OP1) in the X-axis direction, in the aspect 1. According to the aforementioned configuration, it is possible to prevent occurrence of moire having a cycle in the X-axis direction in the image displayed in the image display region.

In the display device 1 according to an aspect 3 of the invention, it is preferable that the openings (second openings OP2) are formed side by side in the X-axis direction, and when a width of each of the light output regions (first openings OP1) in the X-axis direction is W1X and a width of each of the openings in the X-axis direction is W2X, and in a sectional surface of the first light shielding member and the second light shielding member, which is taken along the X-axis direction, a point where a straight line that extends from the observation point 5 to the first plane A1 and the second plane A2 passes through a point X1 (point A22) which is an intersection point of a side wall, which is farther from the center of the image display region among side walls that constitute a target opening (target second opening OP2t) to be focused on among the openings, and the second plane and crosses the first plane A1 is a point X2 (point A12), a point where a perpendicular line that extends from the point X1 (point A22) perpendicularly to the first plane A1 crosses the first plane is a point X3 (point A13), and a distance between the point X1 (point A12) and the point X3 (point A13) is $\Delta LX$, $(W1X-W2X)/2 > \Delta LX$ is established, in the aspect 1.

According to the aforementioned configuration, when the observer observes the image displayed in the image display region from the observation point, it is possible to prevent that the first non-opening is seen through the opening. This makes it possible to prevent occurrence of moire having a cycle in the X-axis direction in the image displayed in the image display region.

In the display device 1 according to an aspect 4 of the invention, it is preferable that the openings (second openings OP2) are formed side by side in the X-axis direction, and when a width of each of the first non-openings 19 in the X-axis direction is P1X, a width of each of the second non-openings 21B in the X-axis direction is P2X, a plane including a surface of the first non-opening 19, which is closer to the observation point 5B, is a third plane B1, and a plane including a surface of the second non-opening 21B, which is closer to the observation point 5B, is a fourth plane B2, in a sectional surface of the first light shielding member and the second light shielding member, which is taken along the X-axis direction, the second non-opening 21B covers a part of the surface of the first non-opening 19, which is closer to the observation point 5B, and when a point where a straight line that extends from the observation point 5B to the third plane B1 and the fourth plane B2 passes through a point X1 (point B12) which is an intersection point of a side wall 19c, which is farther from the center of the image display region among side walls 19c and 19d that constitute a target first non-opening 19t to be focused on among the first non-openings 19, and the third plane B1 and crosses the fourth plane B2 is a point X2 (point B22), a point where a perpendicular line that extends from the point X2 (point B22) perpendicularly to the third plane B1 crosses the third plane is a point X3 (point B13), and a distance between the point X1 (point B12) and the point X3 (point B13) is $\Delta LBX$, $(P1X-P2X)/2 > \Delta LBX$ is established, in the aspect 1.

According to the aforementioned configuration, when the observer observes the image displayed in the image display region from the observation point, it is possible to prevent that the second non-opening is seen as being protruded from the first non-opening. This makes it possible to prevent occurrence of moire having a cycle in the X-axis direction in the image displayed in the image display region.

A display device 1B according to an aspect 5 of the invention includes: a first light shielding member 13 that has, in an image display region of a display 10, light output regions (first openings OP1) of pixels PIX arranged side by side in an X-axis direction and a Y-axis direction which are orthogonal to each other, and first non-openings 19 that surround the light output regions in a lattice shape; and a second light shielding member 20B that has openings (second openings OP2B) arranged so as to cover the image display region and formed side by side in the Y-axis direction, and second non-openings 21B provided between the openings (second openings OP2), in which when a point apart from a center of the image display region by a specific distance is an observation point 5B, a width of each of the first non-openings 19 in the Y-axis direction is P1Y, a width of each of the second non-openings 21B in the Y-axis direction is P2Y, a plane including a surface of the first non-opening 19, which is closer to the observation point 5B, is a third plane B1, and a plane including a surface of the second non-opening 21B, which is closer to the observation point 5B, is a fourth plane B2, in a sectional surface of the first light shielding member and the second light shielding member, which is taken along the Y-axis direction, the second non-opening 21B covers a part of the surface of the first non-opening 19, which is closer to the observation point 5B, and when a point where a straight line that extends from the observation point 5B to the third plane B1 and the fourth plane B2 passes through a point Y1 (point B12) which is an intersection point of a side wall 19c, which is farther from the center of the image display region among side walls 19c and 19d that constitute a target first non-opening 19t to be focused on among the first non-openings 19, and the third plane B1 and crosses the fourth plane B2 is a point Y2 (point B22), a point where a perpendicular line that extends from the point Y2 (point B22) perpendicularly to the third plane B1 crosses the third plane is a point Y3 (point B13), and a distance between the point Y1 (point B12) and the point Y3 (point B13) is ΔLBY, (P1Y−P2Y)/2>ΔLBY is established.

According to the aforementioned configuration, when the observer observes the image displayed in the image display region from the observation point, it is possible to prevent that the second non-opening is seen as being protruded from the first non-opening. This makes it possible to prevent occurrence of moire in the image displayed in the image display region.

In the display device 1B according to an aspect 6 of the invention, it is preferable that the openings (second openings OP2) are formed side by side in the X-axis direction, and when a width of each of the first non-openings 19 in the X-axis direction is P1X and a width of each of the second non-openings 21B in the X-axis direction is P2X, a plane including a surface of the first non-opening 19, which is closer to the observation point 5B, is a third plane B1, and a plane including a surface of the second non-opening 21B, which is closer to the observation point 5B, is a fourth plane B2, in a sectional surface of the first light shielding member and the second light shielding member, which is taken along the X-axis direction, the second non-opening 21B covers a part of the surface of the first non-opening 19, which is closer to the observation point 5B, and when a point where a straight line that extends from the observation point 5B to the third plane B1 and the fourth plane B2 passes through a point X1 (point B12) which is an intersection point of a side wall 19c, which is farther from the center of the image display region among side walls 19c and 19d that constitute a target first non-opening 19t to be focused on among the first non-openings 19, and the third plane B1 and crosses the fourth plane B2 is a point X2 (point B22), a point where a perpendicular line that extends from the point X2 (point B22) perpendicularly to the third plane B1 crosses the third plane is a point X3 (point B13), and a distance between the point X1 (point B12) and the point X3 (point B13) is ΔLBX, (P1X−P2X)/2>ΔLBX is established, in the aspect 5.

According to the aforementioned configuration, when the observer observes the image displayed in the image display region from the observation point, it is possible to prevent that the second non-opening is seen as being protruded from the first non-opening. This makes it possible to prevent occurrence of moire having a cycle in the X-axis direction in the image displayed in the image display region.

The invention is not limited to each of the embodiments described above, and may be modified in various manners within the scope indicated in the claims and an embodiment achieved by appropriately combining technical means disclosed in different embodiments is also encompassed in the technical scope of the invention. Further, by combining the technical means disclosed in each of the embodiments, a new technical feature may be formed.

REFERENCE SIGNS LIST 1, 1A, 1B display device
3 backlight
5, 5B observation point
10 display
11 element substrate
12 glass substrate
13 first light shielding member
16 facing substrate
19 first non-opening
19a, 21Ba front surface
19t target first non-opening
21Bt target second non-opening
20, 20A, 20B second light shielding member
21, 21A, 21B second non-opening
OP1 first opening
OP1t target first opening
OP2, OP2A, OP2B second opening
OP2t target second opening
A1 first plane
A2 second plane
B1 third plane
B2 fourth plane

The invention claimed is:

1. A display device comprising:
a first tight shielding member that has, in an image display region of a display, light output regions of pixels arranged side by side in an X-axis direction and a Y-axis direction Which are orthogonal to each other, and first non-openings that surround the light output regions in a lattice shape; and
a second light shielding member that has openings arranged so as to cover the image display region and formed side by side in the Y-axis direction, and second non-openings provided between the openings, wherein
when a point apart from a center of the image display region by a specific distance is an observation point,
a width of each of the light output regions in the Y-axis direction is W1Y, a width of each of the openings in the Y-axis direction is W2Y, a plane including a surface of each of the first non-openings, which is farther from the observation point, is a first plane, and a plane including a surface of each of the second non-openings, which is farther from the observation point, is a second plane,
in a sectional surface of the first light shielding member and the second light shielding member, which is taken along the Y-axis direction,
the second non-opening covers a whole of a surface of the first non-opening, which is closer to the observation point, and
when a point where a straight line that extends from the observation point to the first plane and the second plane passes through a point Y1 which is an intersection point of a side wall, which is farther from the center of the image display region among side walls that constitute a target opening to be focused on among the openings, and the second plane and crosses the first plane is a point Y2,
a point where a perpendicular line that extends from the point Y1 perpendicularly to the first plane crosses the first plane is a point Y3, and
a distance between the point Y2 and the point Y3 is ΔLY, (W1Y-W2Y)/2>ΔLY is established.

2. The display device according to claim 1, wherein the openings extend so as to cross the plurality of light output regions in the X-axis direction.

3. The display device according to claim 1, wherein
the openings are formed side by side in the X-axis direction, and
when a width of each of the light output regions in the X-axis direction is W1X and a width of each of the openings in the X-axis direction is W2X, and
in a sectional surface of the first light shielding member and the second light shielding member, which is taken along the X-axis direction,
a point where a straight line that extends from the observation point to the first plane and the second plane passes through a point X1 which is an intersection point of a side wall, which is farther from the center of the image display region among side walls that constitute a target opening to be focused on among the openings, and the second plane and crosses the first plane is a point X2,
a point where a perpendicular line that extends from the point X1 perpendicularly to the first plane crosses the first plane is a point X3, and
a distance between the point X2 and the point X3 is ΔLX, (W1X-W2X)/2>ΔLX is established.

4. The display device according to claim 1, wherein
the openings are formed side by side in the X-axis direction, and
when a width of each of the first non-openings in the X-axis direction is P1X, a width of each of the second non-openings in the X-axis direction is P2X, a plane including a surface of the first non-opening, which is closer to the observation point, is a third plane, and a plane including a surface of the second non-opening, which is closer to the observation point, is a fourth plane,
in a sectional surface of the first light shielding member and the second light shielding member, which is taken along the X-axis direction,
the second non-opening covers a part of the surface of the first non-opening, which is closer to the observation point, and
when a point where a straight line that extends from the observation point to the third plane and the fourth plane passes through a point X1 which is an intersection point of a side wall, which is farther from the center of the image display region among side walls that constitute a target first non-opening to be focused on among the first non-openings, and the third plane and crosses the fourth plane is a point X2,
a point where a perpendicular line that extends from the point X2 perpendicularly to the third plane crosses the third plane is a point X3, and a distance between the point X1 and the point X3 is ΔLBX,
(P1X P2X)/2>ΔLBX is established.

5. A display device comprising:
a first light shielding member that has, in an image display region of a display, light output regions of pixels arranged side by side in an X-axis direction and a Y-axis direction Which are orthogonal to each other, and first non-openings that surround the light output regions in a lattice shape; and
a second light shielding member that has openings arranged so as to cover the image display region and formed side by side in the Y-axis direction, and second non-openings provided between the openings, wherein
when a point apart from a center of the image display region by a specific distance is an observation point,
a width of each of the first non-openings in the Y-axis direction is P1Y, a width of each of the second non-openings in the Y-axis direction is P2Y, a plane including a surface of the first non-opening, which is closer to the observation point, is a third plane, and a plane including a surface of the second non-opening, which is closer to the observation point, is a fourth plane,
in a sectional surface of the first light shielding member and the second light shielding member, which is taken along the Y-axis direction,
the second non-opening covers a part of the surface of the first non-opening, which is closer to the observation point, and
when a point where a straight line that extends from the observation point to the third plane and the fourth plane passes through a point Y1 which is an intersection point of a side wall, which is farther from the center of the image display region among side walls that constitute a target first non-opening to be focused on among the first non-openings, and the third plane and crosses the fourth plane is a point Y2,
a point where a perpendicular line that extends from the point Y2 perpendicularly to the third plane crosses the third plane is a point Y3, and a distance between the point Y1 and the point Y3 is ΔLBY,
(P1Y-P2Y)/2>ΔLBY is established.

6. The display device according to claim 5, wherein
the openings are formed side by side in the X-axis direction, and
when a width of each of the first non-openings in the X-axis direction is P1X and a width of each of the second non-openings in the X-axis direction is P2X, a plane including a surface of the first non-opening, which is closer to the observation point, is a third plane, and a plane including a surface of the second non-opening, which is closer to the observation point, is a fourth plane,
in a sectional surface of the first light shielding member and the second light shielding member, which is taken along the X-axis direction,
the second non-opening covers a part of the surface of the first-non opening, which is closer to the observation point, and
when a point where a straight line that extends from the observation point to the third plane and the fourth plane passes through a point X1 which is an intersection point of a side wall, which is farther from the center of the image display region among side walls that constitute a target first non-opening to be focused on among the first non-openings, and the third plane and crosses the fourth plane is a point X2,
a point where a perpendicular line that extends from the point X2 perpendicularly to the third plane crosses the third plane is a point X3, and a distance between the point X1 and the point X3 is ΔLBX,
(P1X-P2X)/2>ΔLBX is established.

* * * * *